United States Patent
Ramirez et al.

(10) Patent No.: US 12,271,349 B2
(45) Date of Patent: Apr. 8, 2025

(54) SYSTEM AND METHOD FOR INTEGRATED FUNCTION EDITOR FOR USE IN DATA ANALYTICS ENVIRONMENT

(71) Applicant: ORACLE INTERNATIONAL CORPORATION, Redwood Shores, CA (US)

(72) Inventors: Luis Ramirez, Guadalajara (MX); Monisha Balaji, Redwood Shores, CA (US); Jorge Zuniga, Guadalajara (MX); Shreya Sawant, Redwood Shores, CA (US); Rutuja Joshi, Redwood City, CA (US); Kenneth Eng, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/116,707

(22) Filed: Mar. 2, 2023

(65) Prior Publication Data
US 2024/0126725 A1 Apr. 18, 2024

Related U.S. Application Data

(60) Provisional application No. 63/416,377, filed on Oct. 14, 2022.

(51) Int. Cl.
*G06F 16/21* (2019.01)

(52) U.S. Cl.
CPC .................................. *G06F 16/21* (2019.01)

(58) Field of Classification Search
CPC ....... G06F 16/21; G06F 16/26; G06F 16/2465
See application file for complete search history.

(56) References Cited

U.S. PATENT DOCUMENTS

| 11,182,691 B1 * | 11/2021 | Zhang | G06N 20/20 |
| 2017/0085445 A1 * | 3/2017 | Layman | G06F 8/34 |
| 2022/0116455 A1 * | 4/2022 | Raghunath | H04L 67/146 |

* cited by examiner

*Primary Examiner* — Etienne P Leroux
*Assistant Examiner* — Cindy Nguyen
(74) *Attorney, Agent, or Firm* — TUCKER ELLIS LLP

(57) ABSTRACT

Described herein is a system and method for providing an integrated function editor, for use with a data analytics environment. The function editor can be utilized to create and register functions available within a cloud infrastructure or cloud environment, for use within a data analytics environment. Such functions available for use within the cloud infrastructure or cloud environment can be displayed for the user, and used, for example, in data analytics workbooks, to create an interface or API that allows connection of the data analytics environment to a cloud infrastructure database.

20 Claims, 27 Drawing Sheets

Register an OCI Function
POST /datasetsvc/api/v5/oci/fn/{connectionid}/{compartment_id}/{compartment_name}/{application_name}

```
{
"name" : "orahack_demo",
"description" : "my description",
"status" : {
    "returnCode" : 0,
    "errorMessage" : " "
},
"funcDescription" : {
    "outputs" : [{"name" : "columnA", "dataType" : "varchar(10)"},
                 {"name" : "columnB", "dataType" : "integer"}],
    "parameters" : [ ],
    "bucketName" : "My bucket",
    "isOutputJoinablewithInput" : true
  }
}
```

```
{
"name" : "orahack_demo",
"namespace" : "namespace"
}
```

User Interface 12

*FIGURE 20*

Register an OCI Function
POST /datasetsvc/api/v5/oci/fn/{connectionid}/{compartment_id}/{compartment_name}/{application_name}

← Select a Function                    [Search] [🔍] [Create New Function]

Type Function
- ⬡ sentiment_analysis
- ⬡ word_counter
- ⚠ ⬡ hello-world_oac-compatible-false
- ⚠ ⬡ word_counter_not_oac ⚠ Incompatible function. See compatibility requirements.

[Cancel] [Register]

← Create New Function
Enter Function Parameters    [Search] [🔍]

| Details | Code |

Function name   [orahacks_fn_demo]
Description     [orahacks_fn_description]
Bucket name     [OAC_orahacks22]

▶ Parameters [Add]
▲ Output Columns [Add]

[Cancel] [Register and Deploy]

User Interface 12

*FIGURE 21*

Register an OCI Function
POST /datasetsvc/api/v5/oci/fn/{connectionid}/{compartment_id}/{compartment_name}/{application_name}

← Create New Function

Enter Function Parameters    [Search            🔍]

| Details | Code |

📄 main.py   ✕

```
1  import io
2  import json
3
4  from fdk import response
5
6  def get_func_definition():
7      func_definition = {}
8      return func_definition
9
10 def handler(ctx, data: io.BytesIO = None):
11     response_data = json.dumps(get_func_definition())
12     return response.Response(
13         ctx, response_data,
14         headers={"Content-Type", "application/json"}
15     )
16
```

[Cancel] [Register and Deploy]

---

← Create New Function

Enter Function Parameters    [Search            🔍]

| Details | Code |

📄 main.py   ✕

```
1  import io
2  import json
3
4  fro
5
6  de
7
8
9
10 def handler(ctx, data: io.BytesIO = None):
11     response_data = json.dumps(get_func_definition())
12     return response.Response(
13         ctx, response_data,
14         headers={"Content-Type", "application/json"}
15     )
16
```

Function Saved Successfully orahacks_fn_demo was saved!

[Close]

[Cancel] [Register and Deploy]

User Interface 12

*FIGURE 22*

List OCI Function files and their content
GET /datasetsvc/api/v5/oci/fn/{connectionid}/{compartment_id}/{compartment_name}/{application_id}/{function-id}
GET /datasetsvc/api/v5/oci/fn/{connectionid}/{compartment_id}/{compartment_name}/{application_id}/{function-id}/{file} orahack_fn_demo
Script

| General | main.py | func.yaml | requirements.txt |
| Details | | | |
| Access | | | |
| Code Editor | | | | main.py ×

```
1  import io
2  import json
3
4  from fdk import response
5  def get_func_definition():
6      func_definition = {}
7      return func_definition
8
9  def handler(ctx, data: io.BytesIO = None):
10     response_data = json.dumps(get_func_definition())
11     return response.Response(
12         ctx, response_data,
13         headers={"Content-Type", "application/json"}
14     )
15
16
17
18
19
20
21
22
23
```

Save    Close

User Interface 12

*FIGURE 23*

Redeploy a function
POST /datasetsvc/api/v5/oci/fn/{connectionid}/{compartment_id}/{compartment_name}/{application_id}/{function-id}/redeploy

| ≡ Machine Learning | | | | Create |
|---|---|---|---|---|
| Models Scripts | | Search Machine Learning 🔍 | Sort By Modified ▼ | |
| Type | Name | Connection | Owner | Modified ▼ |
| ◈ | orahack_fn_demo | Oracle OCI Resource | bitechtest | Just now |
| ◈ | AP-test-faas | Oracle OCI Resource | bitechtest | Mar 22, 2022 |

Inspect
Redeploy
Delete

User Interface 12

*FIGURE 25*

FIGURE 26

SYSTEM AND METHOD FOR INTEGRATED FUNCTION EDITOR FOR USE IN DATA ANALYTICS ENVIRONMENT

CLAIM OF PRIORITY AND CROSS-REFERENCE TO RELATED APPLICATIONS

This application claims the benefit of priority to U.S. Provisional Patent Application titled "SYSTEM AND METHOD FOR INTEGRATED FUNCTION EDITOR FOR USE IN DATA ANALYTICS ENVIRONMENT", Application No. 63/416,377, filed Oct. 14, 2022, which application and its contents are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and computer-based methods of providing business intelligence or other data, and are particularly related to a system and method for providing an integrated function editor, for use with a data analytics environment.

BACKGROUND

Data analytics enables computer-based examination of large amounts of data, for example to derive conclusions or other information from the data. For example, business intelligence tools can be used to provide users with business intelligence describing their enterprise data, in a format that enables the users to make strategic business decisions.

SUMMARY

Described herein is a system and method for providing an integrated function editor, for use with a data analytics environment. The function editor can be utilized to create and register functions available within a cloud infrastructure or cloud environment, for use within a data analytics environment. Such functions available for use within the cloud infrastructure or cloud environment can be displayed for the user, and used, for example, in data analytics workbooks, to create an interface or API that allows connection of the data analytics environment to a cloud infrastructure database.

BRIEF DESCRIPTION OF THE DRAWINGS

FIG. 20 further illustrates the use of an integrated function editor, in accordance with an embodiment.

FIG. 21 further illustrates the use of an integrated function editor, in accordance with an embodiment.

FIG. 22 further illustrates the use of an integrated function editor, in accordance with an embodiment.

FIG. 23 further illustrates the use of an integrated function editor, in accordance with an embodiment.

FIG. 25 further illustrates the use of an integrated function editor, in accordance with an embodiment.

FIG. 26 further illustrates the use of an integrated function editor, in accordance with an embodiment.

DETAILED DESCRIPTION

Figure 1:
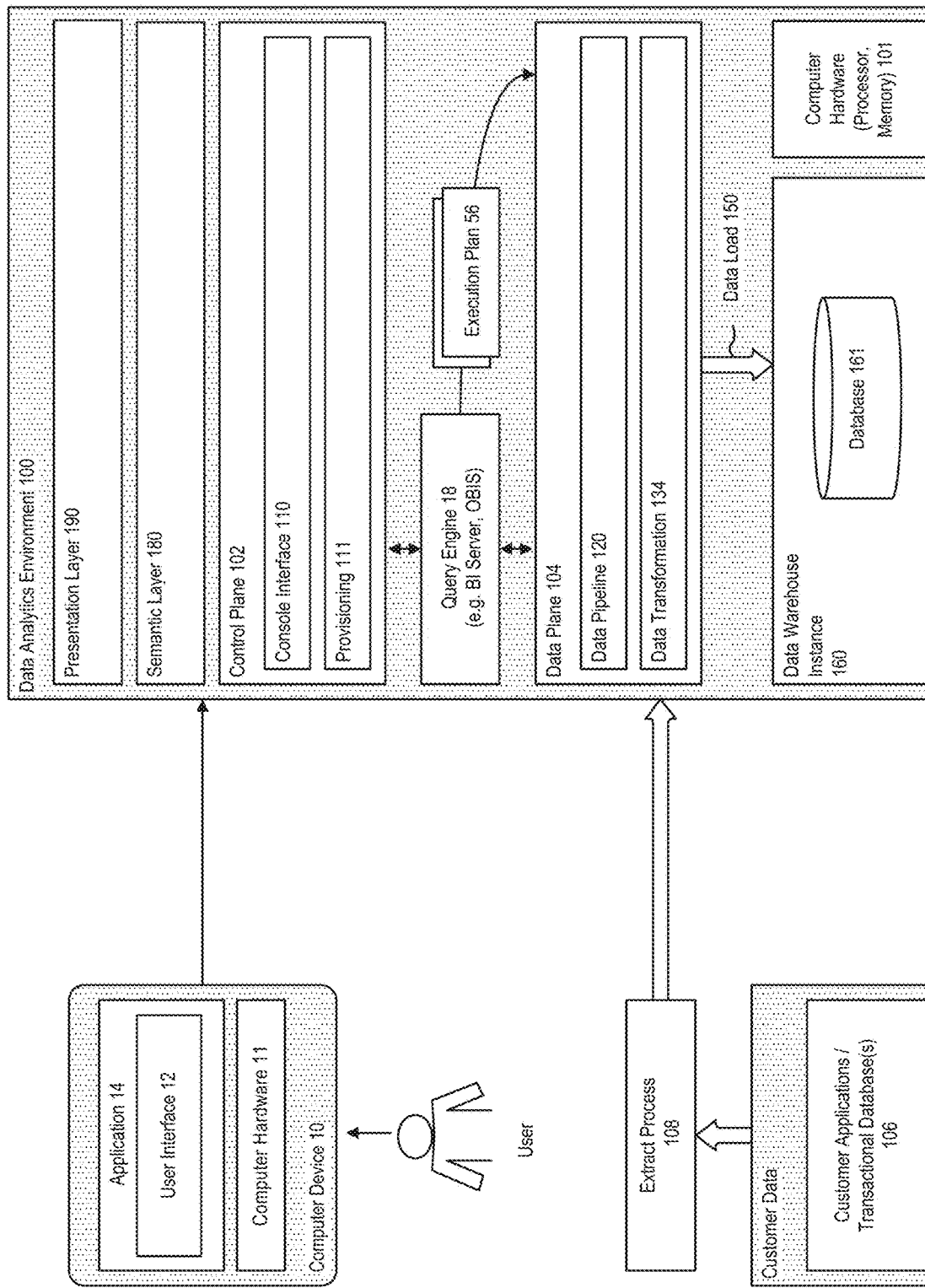
FIG. 1 illustrates an example data analytics environment, in accordance with an embodiment.

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

Examples of such business intelligence tools/servers include Oracle Business Intelligence Applications (OBIA), Oracle Business Intelligence Enterprise Edition (OBIEE), or Oracle Business Intelligence Server (OBIS), which provide a query, reporting, and analysis server that can operate with a database to support features such as data mining or analytics, and analytic applications.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments.

INTRODUCTION

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an OBIS environment, or other type of BI component adapted to examine large amounts of data sourced either by the customer (tenant) itself, or from multiple third-party entities.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Data Analytics

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

Business Intelligence Server

In accordance with an embodiment, a query engine 18 (e.g., an OBIS instance) operates in the manner of a federated query engine to serve analytical queries or requests from clients within, e.g., an Oracle Analytics Cloud environment, directed to data stored at a database.

In accordance with an embodiment, the OBIS instance can push down operations to supported databases, in accordance with a query execution plan 56, wherein a logical query can include Structured Query Language (SQL) statements received from the clients; while a physical query includes database-specific statements that the query engine sends to the database to retrieve data when processing the logical query. In this way the OBIS instance translates business user queries into appropriate database-specific query languages (e.g., Oracle SQL, SQL Server SQL, DB2 SQL, or Essbase MDX). The query engine (e.g., OBIS) can also support internal execution of SQL operators that cannot be pushed down to the databases.

In accordance with an embodiment, a user/developer can interact with a client computer device 10 that includes a computer hardware 11 (e.g., processor, storage, memory), user interface 12, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan, that can include various child (leaf) nodes, generally referred to herein in various embodiments as RqLists, for example:

```
Execution plan:
[[
RqList <<191986>> [for database 0:0,0]
   D102.c1 as c1 [for database 0:0,0],
   sum(D102.c2 by [ D102.c1] ) as c2 [for database 0:0,0]
Child Nodes (RqJoinSpec): <<192970>> [for database 0:0,0]
   RqJoinNode <<192969>> [ ]
     (
      RqList <<193062>> [for database 0:0,0]
         D2.c2 as c1 [for database 0:0,0],
         D1.c2 as c2 [for database 0:0,0]
      Child Nodes (RqJoinSpec): <<193065>> [for database 0:0,0]
         RqJoinNode <<193061>> [ ]
            (
             RqList <<192414>> [for database 0:0,118]
                T1000003.Customer_ID as c1 [for database 0:0,118],
                T1000003.TARGET as c2 [for database 0:0,118]
             Child Nodes (RqJoinSpec): <<192424>> [for database 0:0,118]
                RqJoinNode <<192423>> [ ]
                   [users/administrator/dv_joins/multihub/input::##dataTarget]
                      as T1000003
           ) as D1 LeftOuterJoin (Eager) <<192381>> On D1.c1 = D2.c1;
             actual join vectors: [ 0 ] = [ 0 ]
            (
             RqList <<192443>> [for database 0:0,0]
                D104.c1 as c1 [for database 0:0,0],
                nullifnotunique (D104.c2 by [ D104.c1] ) as c2 [for database 0:0,0]
             Child Nodes (RqJoinSpec): <<192928>> [for database 0:0,0]
                RqJoinNode <<192927>> [ ]
                  (
                   RqList <<192852>> [for database 0:0,118]
                      T1000006.Customer_ID as c1 [for database 0:0,118],
                      T1000006.Customer_City as c2 [for database 0:0, 118]
                   Child Nodes (RqJoinSpec): <<192862>> [for database 0:0,118]
                      RqJoinNode <<192861>> [ ]
                         [users/administrator/dv_joins/my_customers/input::data]
                            as T1000006
                  ) as D104
                GroupBy: [ D104.c1] [for database 0:0,0] sort
                OrderBy: c1, Aggs:[ nullifnotunique(D104.c2 by [ D104.c1] ) ]
                   [for database 0:0,0]
           ) as D2
     ) as D102
   GroupBy: [ D102.c1] [for database 0:0,0] sort
   OrderBy: c1 asc, Aggs:[ sum(D102.c2 by [ D102.c1] ) ] [for database 0:0,0]
```

Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, a query engine can talk to different databases, and for each of these use datasource-specific code generators. A typical strategy is to ship as much SQL execution to the database, by sending it as part of the physical query—this reduces the amount of information being returned to the OBIS server.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
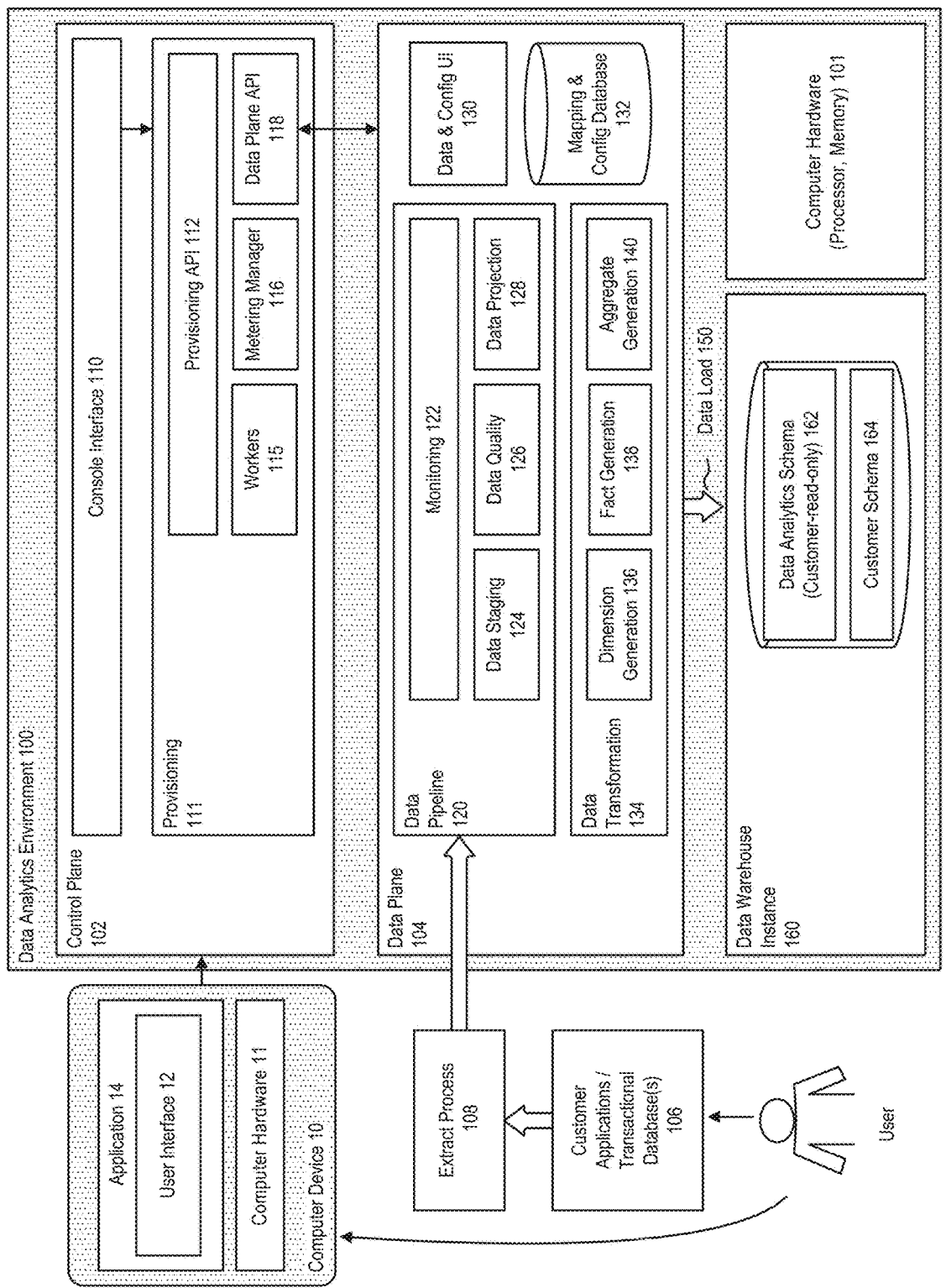
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different datasets (data sets) to be transformed. Based on the determined dependencies, the monitoring component can determine which of several different datasets should be transformed to the model format first.

For example, in accordance with an embodiment, if a first model dataset incudes no dependencies on any other model dataset; and a second model dataset includes dependencies to the first model dataset; then the monitoring component can determine to transform the first dataset before the second dataset, to accommodate the second dataset's dependencies on the first dataset.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
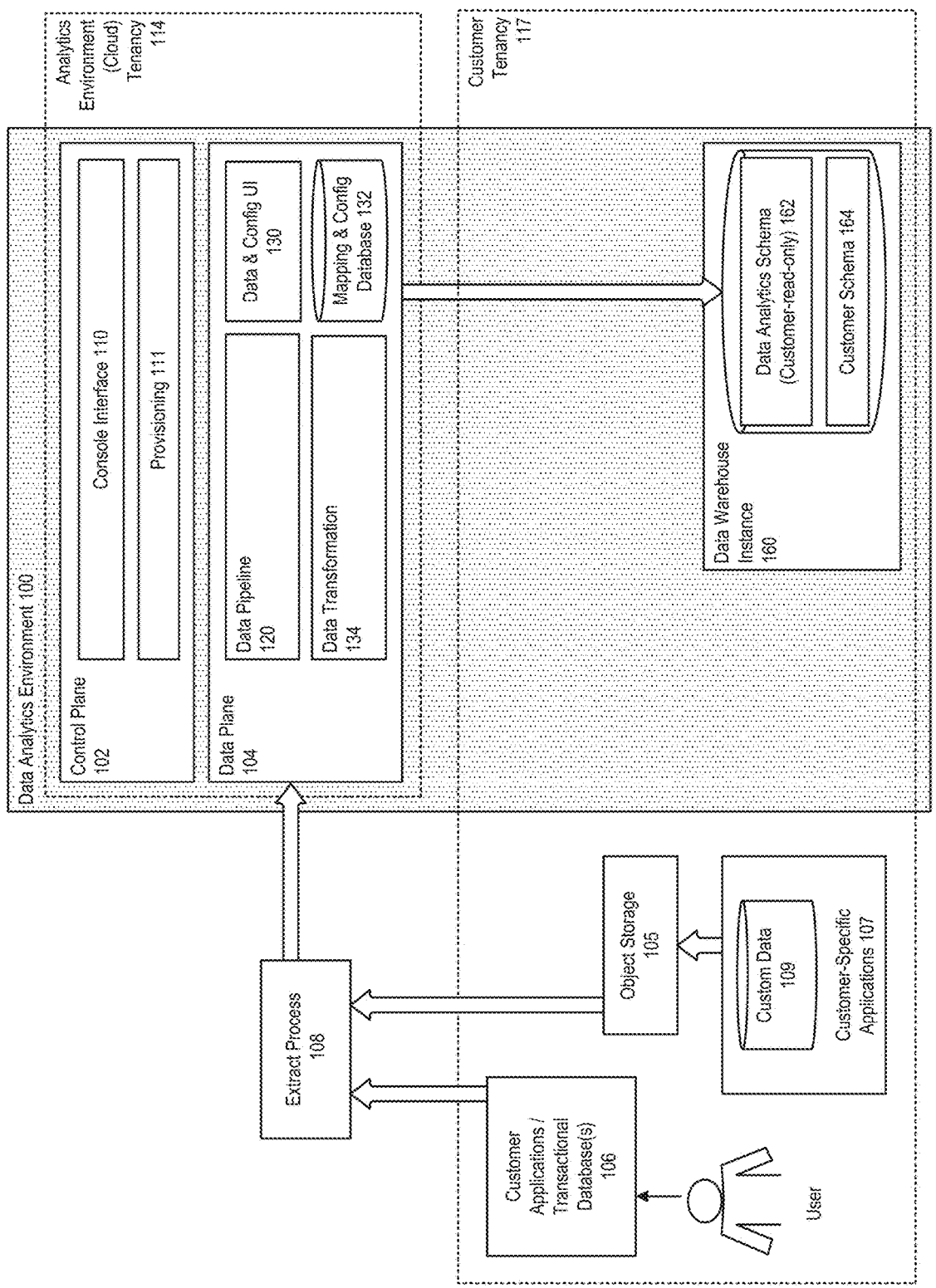
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a dataset that uses tables from different connections and schemas. The system uses the relationships defined between these tables to create relationships or joins in the dataset.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
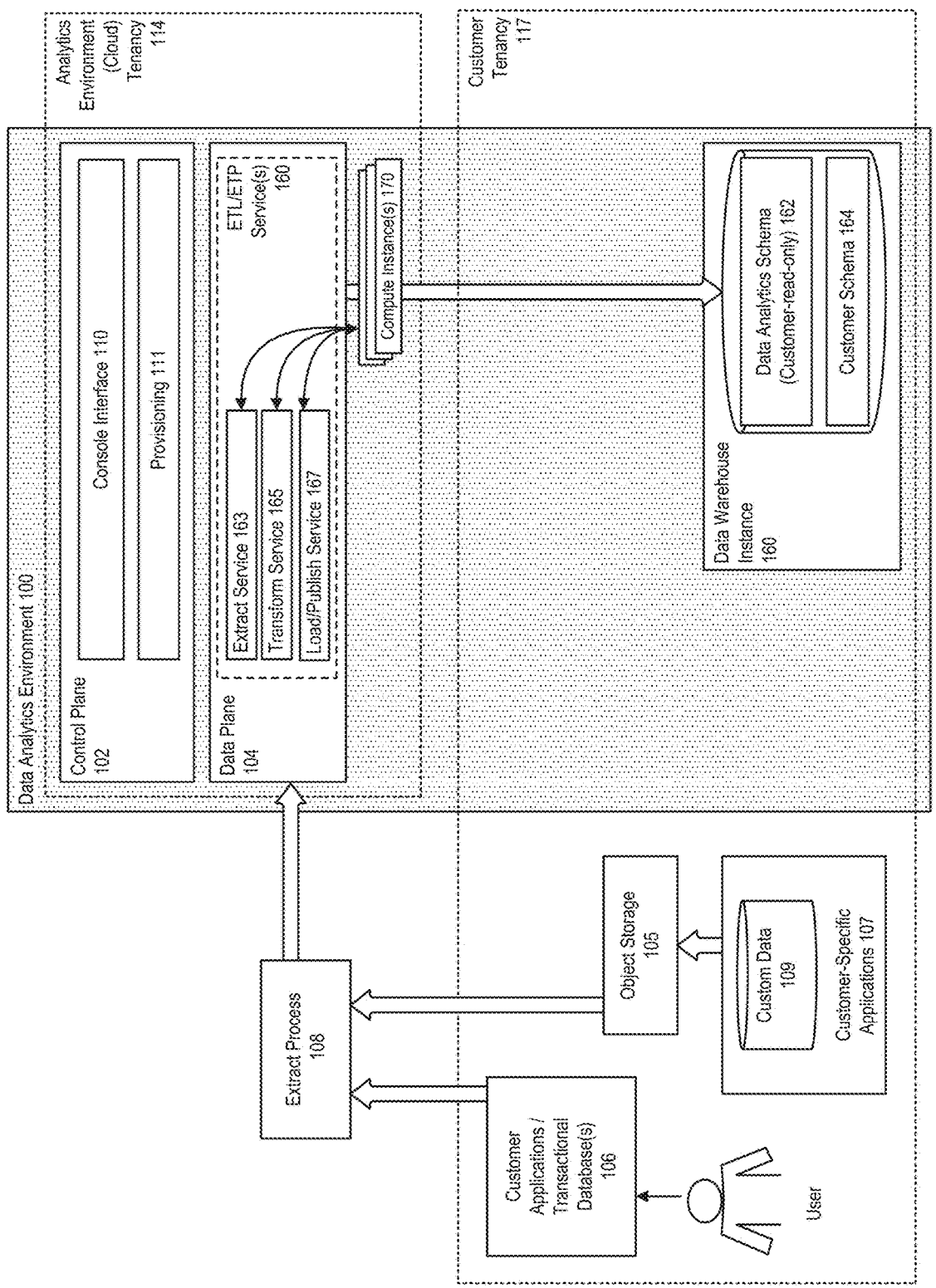
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a REST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
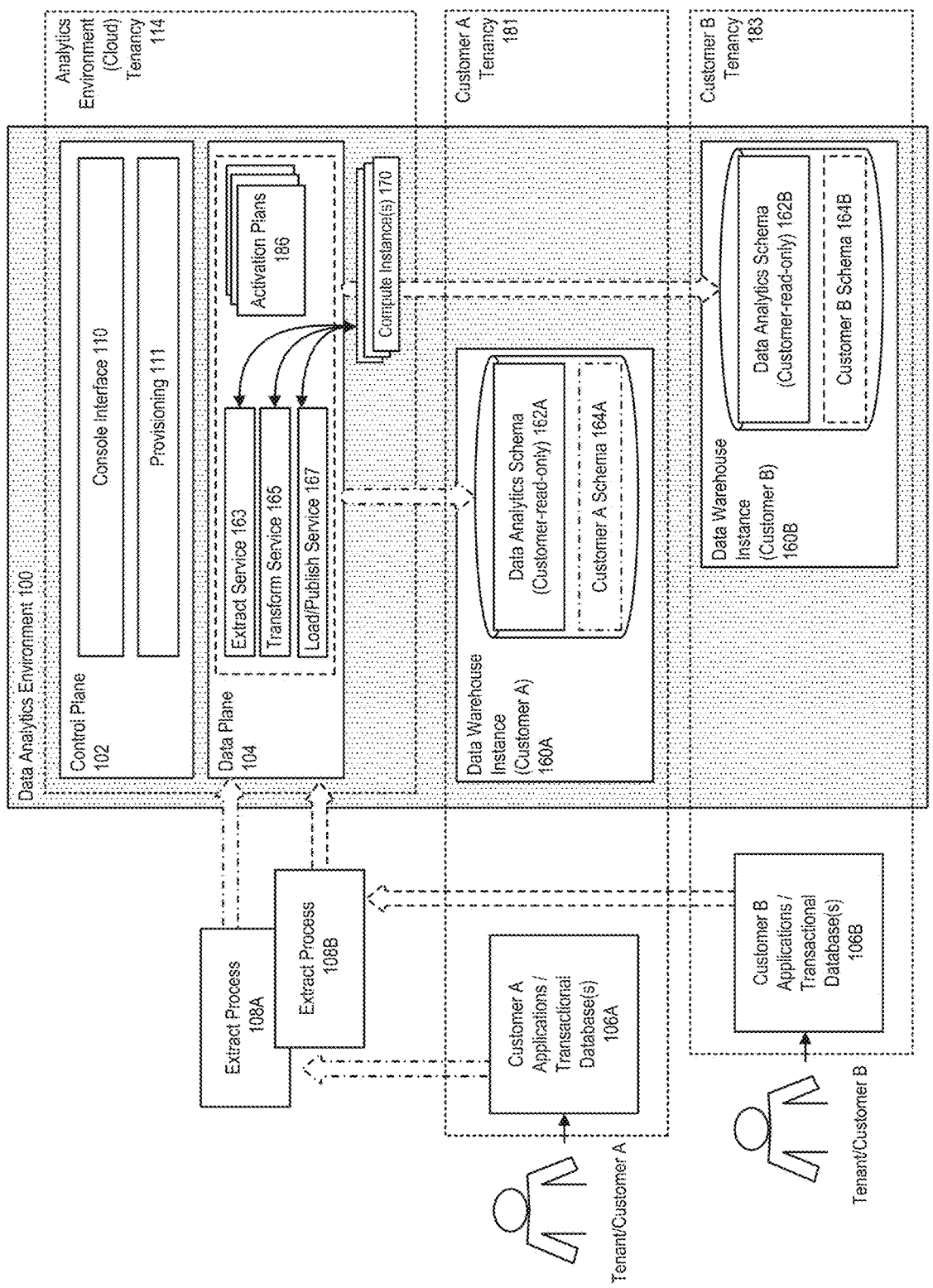
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Figure 6:
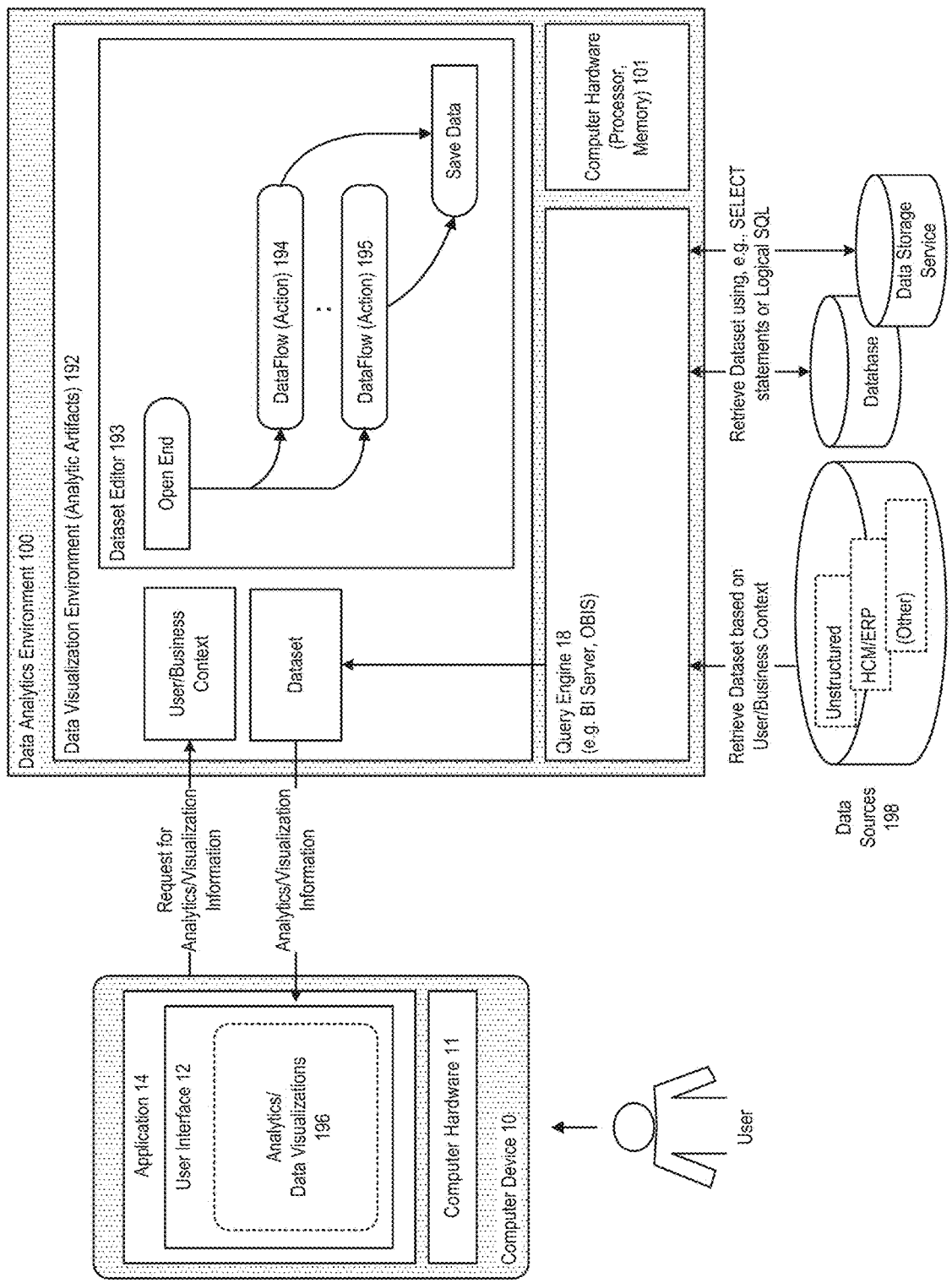
FIG. 6 illustrates a use of the system to transform, analyze, or visualize data, in accordance with an embodiment.

FIG. 6 illustrates a use of the system to transform, analyze, or visualize data, in accordance with an embodiment.

As illustrated in FIG. 6, in accordance with an embodiment, the systems and methods disclosed herein can be used to provide a data visualization environment 192 that enables insights for users of an analytics environment with regard to analytic artifacts and relationships among the same. A model can then be used to visualize relationships between such analytic artifacts via, e.g., a user interface, as a network chart or visualization of relationships and lineage between artifacts (e.g., User, Role, DV Project, Dataset, Connection, Dataflow, Sequence, ML Model, ML Script).

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the analytics system, or in the example of a cloud environment via a cloud service provided by the environment.

In accordance with an embodiment, the user interface can include or provide access to various dataflow action types, as described in further detail below, that enable self-service text analytics, including allowing a user to display a dataset, or interact with the user interface to transform, analyze, or visualize the data, for example to generate graphs, charts, or other types of data analytics or visualizations of dataflows.

In accordance with an embodiment, the analytics system enables a dataset to be retrieved, received, or prepared from one or more data source(s), for example via one or more data source connections. Examples of the types of data that can be transformed, analyzed, or visualized using the systems and methods described herein include HCM, HR, or ERP data, e-mail or text messages, or other of free-form or unstructured textual data provided at one or more of a database, data storage service, or other type of data repository or data source.

For example, in accordance with an embodiment, a request for data analytics or visualization information can be received via a client application and user interface as described above, and communicated to the analytics system (in the example of a cloud environment, via a cloud service). The system can retrieve an appropriate dataset to address the user/business context, for use in generating and returning the requested data analytics or visualization information to the client. For example, the data analytics system can retrieve a dataset using, e.g., SELECT statements or Logical SQL instructions.

In accordance with an embodiment, the system can create a model or dataflow that reflects an understanding of the dataflow or set of input data, by applying various algorithmic processes, to generate visualizations or other types of useful information associated with the data. The model or dataflow can be further modified within a dataset editor 193 by applying various processing or techniques to the dataflow or set of input data, including for example one or more dataflow actions 194, 195 or steps that operate on the dataflow or set of input data. A user can interact with the system via a user interface, to control the use of dataflow actions to generate data analytics, data visualizations 196, or other types of useful information associated with the data.

In accordance with an embodiment, datasets are self-service data models that a user can build for data visualization and analysis requirements. A dataset contains data source connection information, tables, and columns, data enrichments and transformations. A user can use a dataset in multiple workbooks and in dataflows.

In accordance with an embodiment, when a user creates and builds a dataset, they can, for example: choose between many types of connections or spreadsheets; create datasets based on data from multiple tables in a database connection, an Oracle data source, or a local subject area; or create datasets based on data from tables in different connections and subject areas.

For example, in accordance with an embodiment, a user can build a dataset that includes tables from an Autonomous Data Warehouse connection, tables from a Spark connection, and tables from a local subject area; specify joins between tables; and transform and enrich the columns in the dataset.

In accordance with an embodiment, additional artifacts, features, and operations associated with datasets can include, for example:

View available connections: a dataset uses one or more connections to data sources to access and supply data for analysis and visualization. A user list of connections contains the connections that they built and the connections that they have permission to access and use.

Create a dataset from a connection: when a user creates a dataset, they can add tables from one or more data source connections, add joins, and enrich data.

Add multiple connections to a dataset: a dataset can include more than one connection. Adding more connections allows a user to access and join all of the tables and data that they need to build the dataset. The user can add more connections to datasets that support multiple tables.

Create dataset table joins: joins indicate relationships between a dataset's tables. If the user is creating a dataset based on facts and dimensions and if joins already exist in the source tables, then joins are automatically created in the dataset. If the user is creating a dataset from multiple connections and schemas, then they can manually define the joins between tables.

In accordance with an embodiment, a user can use dataflows to create datasets by combining, organizing, and integrating data. Dataflows enable the user to organize and integrate data to produce curated datasets that either they or other users can visualize.

For example, in accordance with an embodiment, a user might use a dataflow to: Create a dataset; Combine data from different source; aggregate data; and train a machine learning model or apply a predictive machine learning model to their data.

In accordance with an embodiment, a dataset editor as described above allows a user to add actions or steps, wherein each step performs a specific function, for example, add data, join tables, merge columns, transform data, or save the data. Each step is validated when the user adds or changes it. When they have configured the dataflow, they can execute it to produce or update a dataset.

In accordance with an embodiment, a user can curate data from datasets, subject areas, or database connections. The user can execute dataflows individually or in a sequence. The user can include multiple data sources in a dataflow and specify how to join them. The user can save the output data from a dataflow in either a dataset or in a supported database type.

In accordance with an embodiment, additional artifacts, features, and operations associated with dataflows can include, for example:

Add columns: add custom columns to a target dataset.

Add data: add data sources to a dataflow. For example, if the user is merging two datasets, they add both datasets to the dataflow.

Aggregate: create group totals by applying aggregate functions; for example, count, sum, or average.

Branch: creates multiple outputs from a dataflow.

Filter: select only the data that the user is interested in.

Join: combine data from multiple data sources using a database join based on a common column.

Graph Analytics: perform geo-spatial analysis, such as calculating the distance or the number of hops between two vertices.

The above are provided by way of example; in accordance with an embodiment other types of steps can be added to a dataflow to transform a dataset or provide data analytics or visualizations.

Dataset Analyses and Visualizations

In accordance with an embodiment, the system provides functionality that allows a user to generate datasets, analyses, or visualizations for display within a user interface, for example to explore datasets or data sourced from multiple data sources.

FIGS. 7-18 illustrate various examples of user interfaces for use with a data analytics environment, in accordance with an embodiment.

The user interfaces and features shown in FIGS. 7-18 are provided by way of example, for purposes of illustration of the various features described herein; in accordance with various embodiments, alternative examples of user interfaces and features can be provided.

Figure 7:
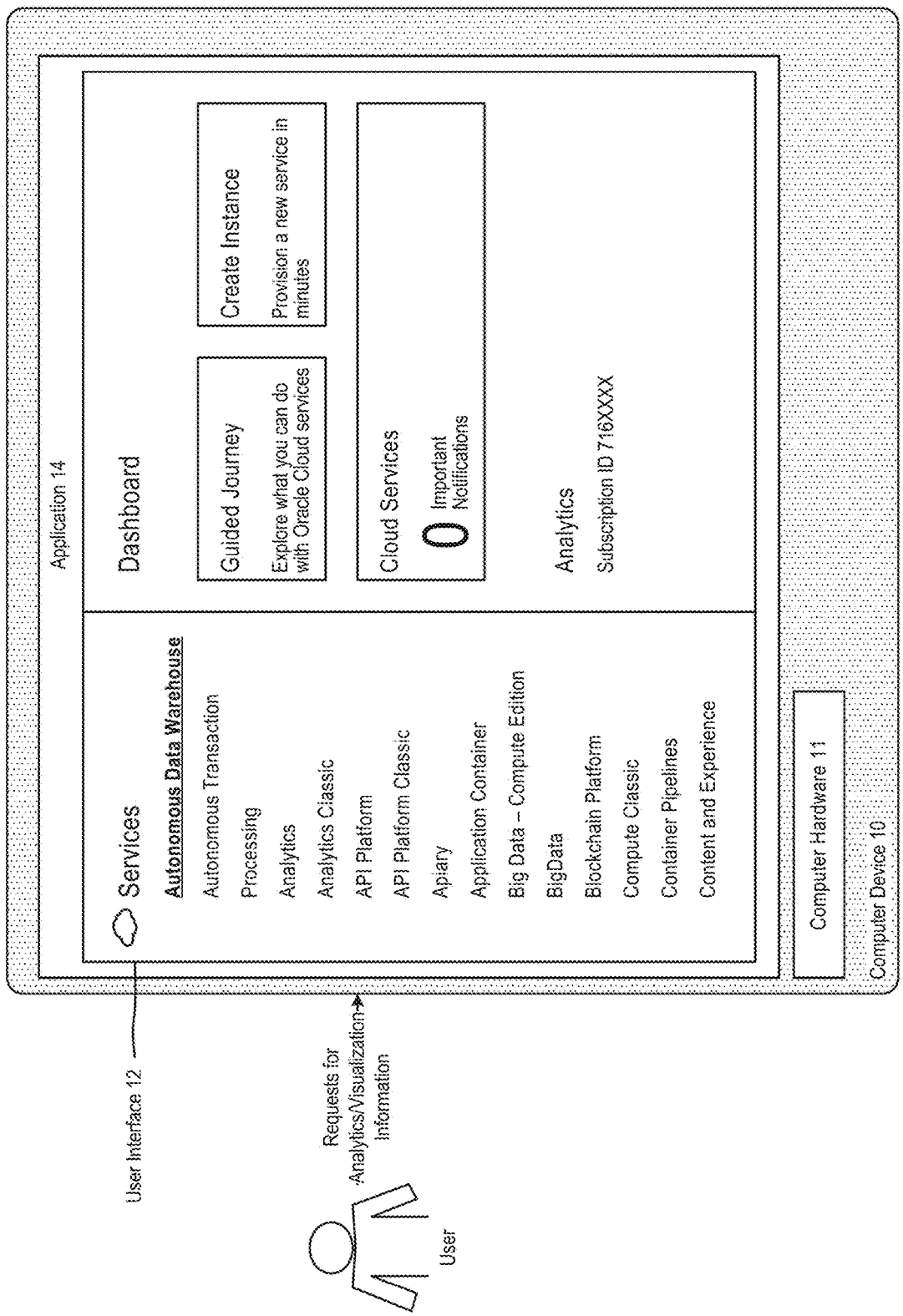
FIG. 7 illustrates various examples of user interfaces for use with a data analytics environment, in accordance with an embodiment.
Figure 8:
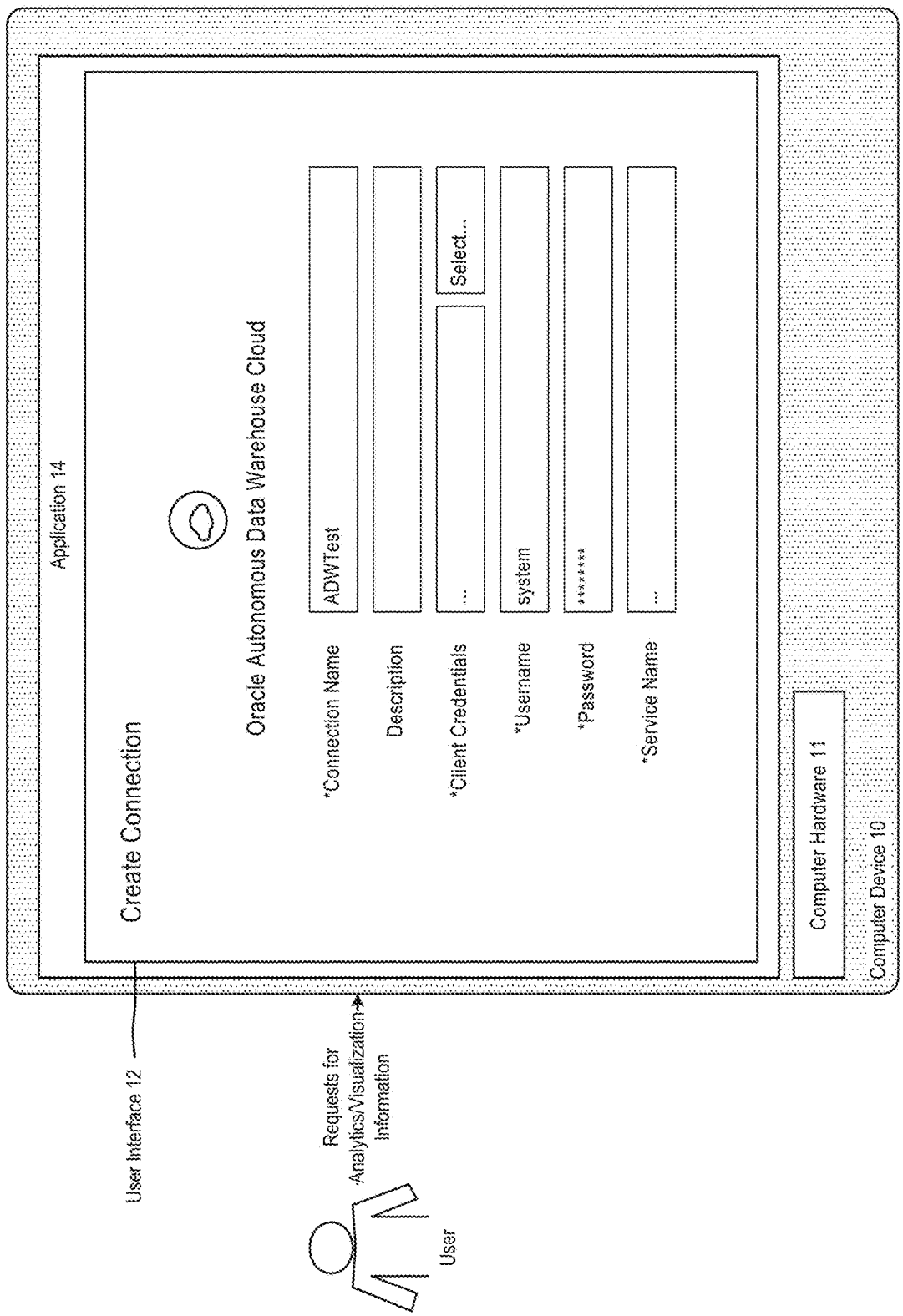
FIG. 8 illustrates various examples of user interfaces for use with a data analytics environment, in accordance with an embodiment.

As illustrated in FIGS. 7-8, in accordance with an embodiment, the user can access the data analytics environment, for example to submit analyses or queries against an organization's data.

For example, in accordance with an embodiment, the user can choose between various types of connections to create datasets based on data from tables in, e.g., a database connection, an Oracle subject area, an Oracle ADW connection, or a spreadsheet, file, or other type of data source. In this manner, a dataset operates as a self-service data model from which the user can build a data analysis or visualization.

Figure 9:
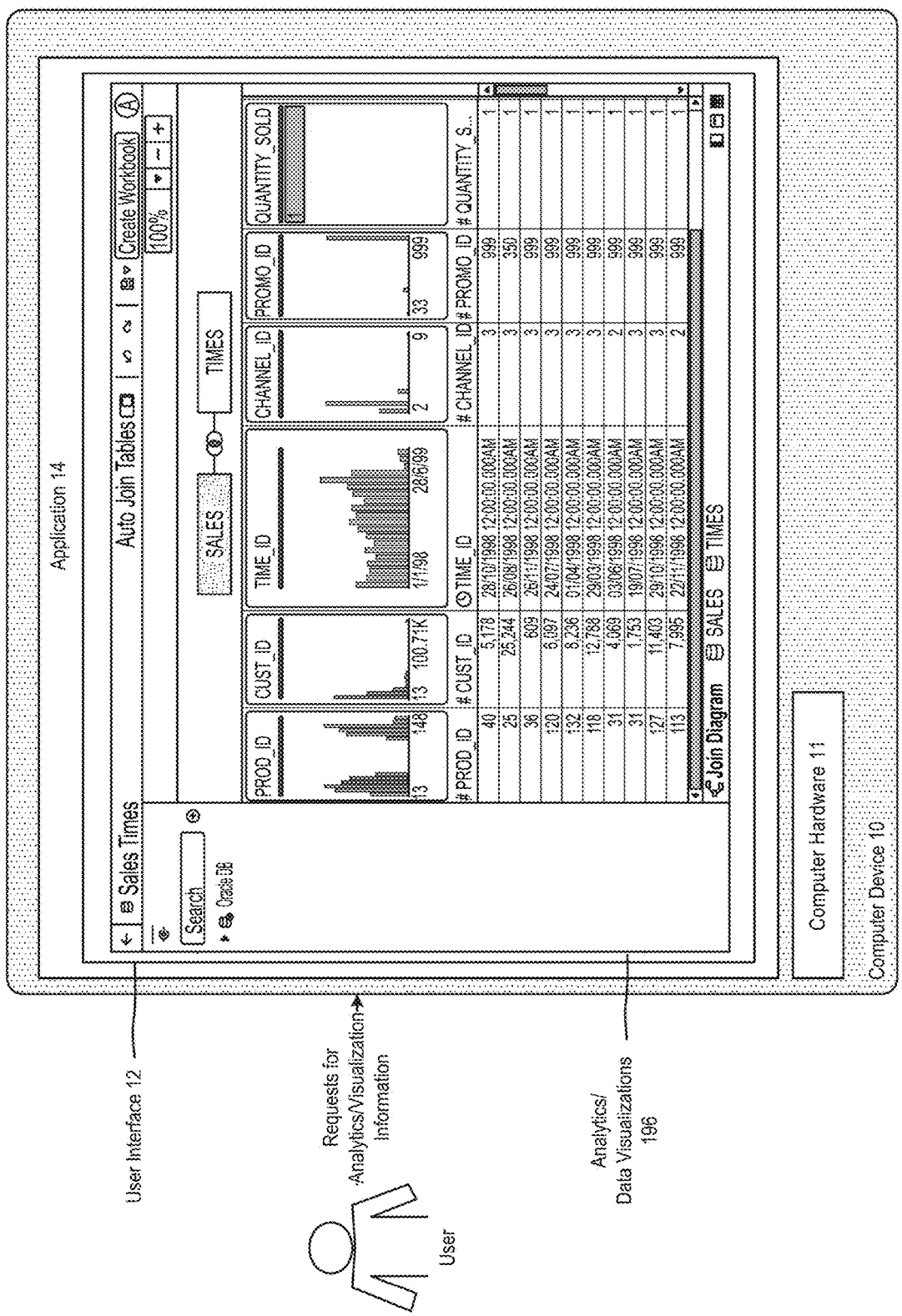
FIG. 9 illustrates various examples of user interfaces for use with a data analytics environment, in accordance with an embodiment.
Figure 10:
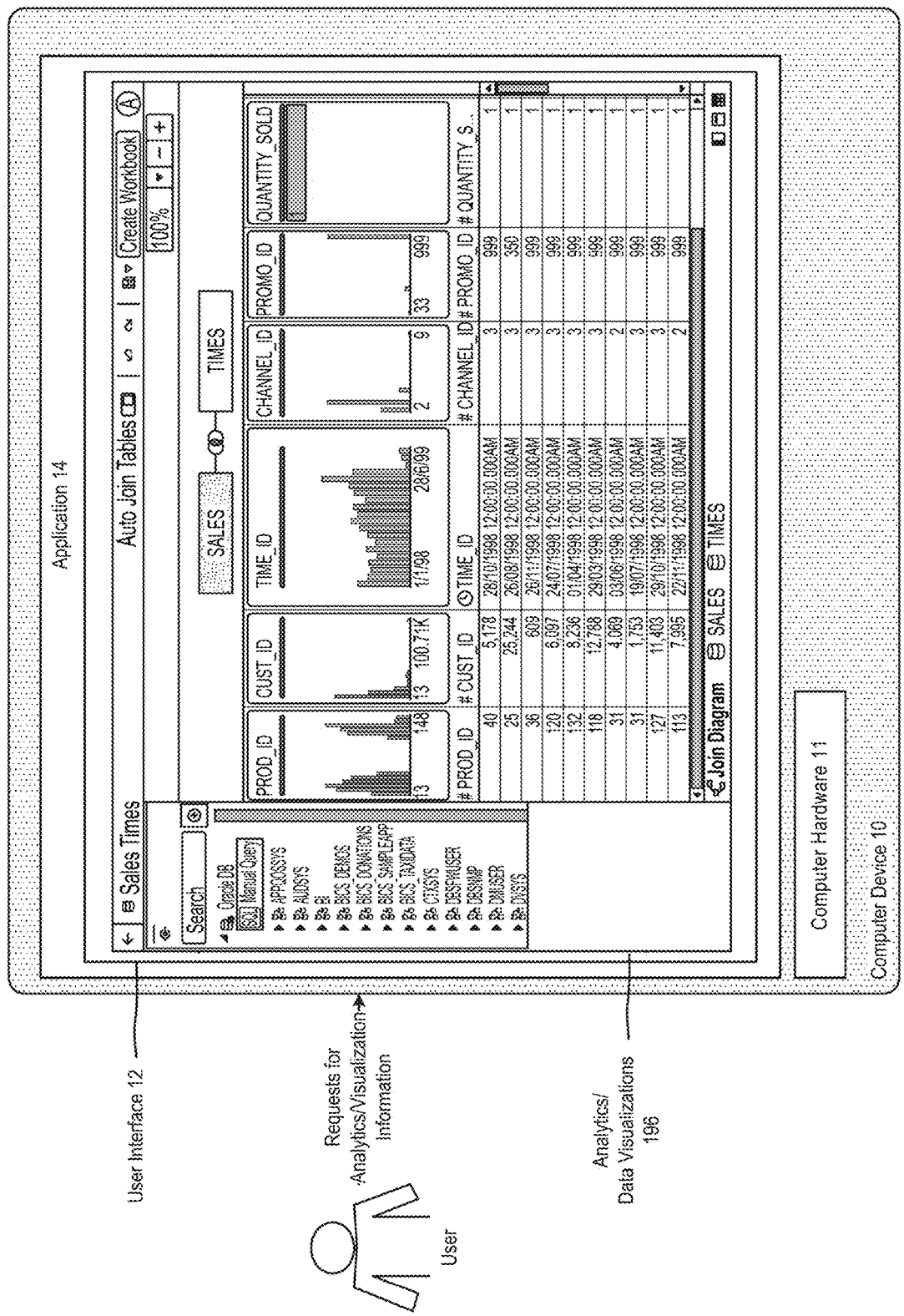
FIG. 10 illustrates various examples of user interfaces for use with a data analytics environment, in accordance with an embodiment.

As illustrated in FIGS. 9-10, in accordance with an embodiment, a dataset editor can display a list of connections which the user has permission to access, and allow the user to create or edit a dataset that includes tables, joins, and/or enriched data. The editor can display the data source connection's schemas and tables, from which the user can drag and drop to a dataset diagram. If a particular connection does not itself provide a schema and table listing the user can use a manual query for appropriate tables. Adding connections provide the ability to access and join their associated tables and data, to build the dataset.

Figure 11:
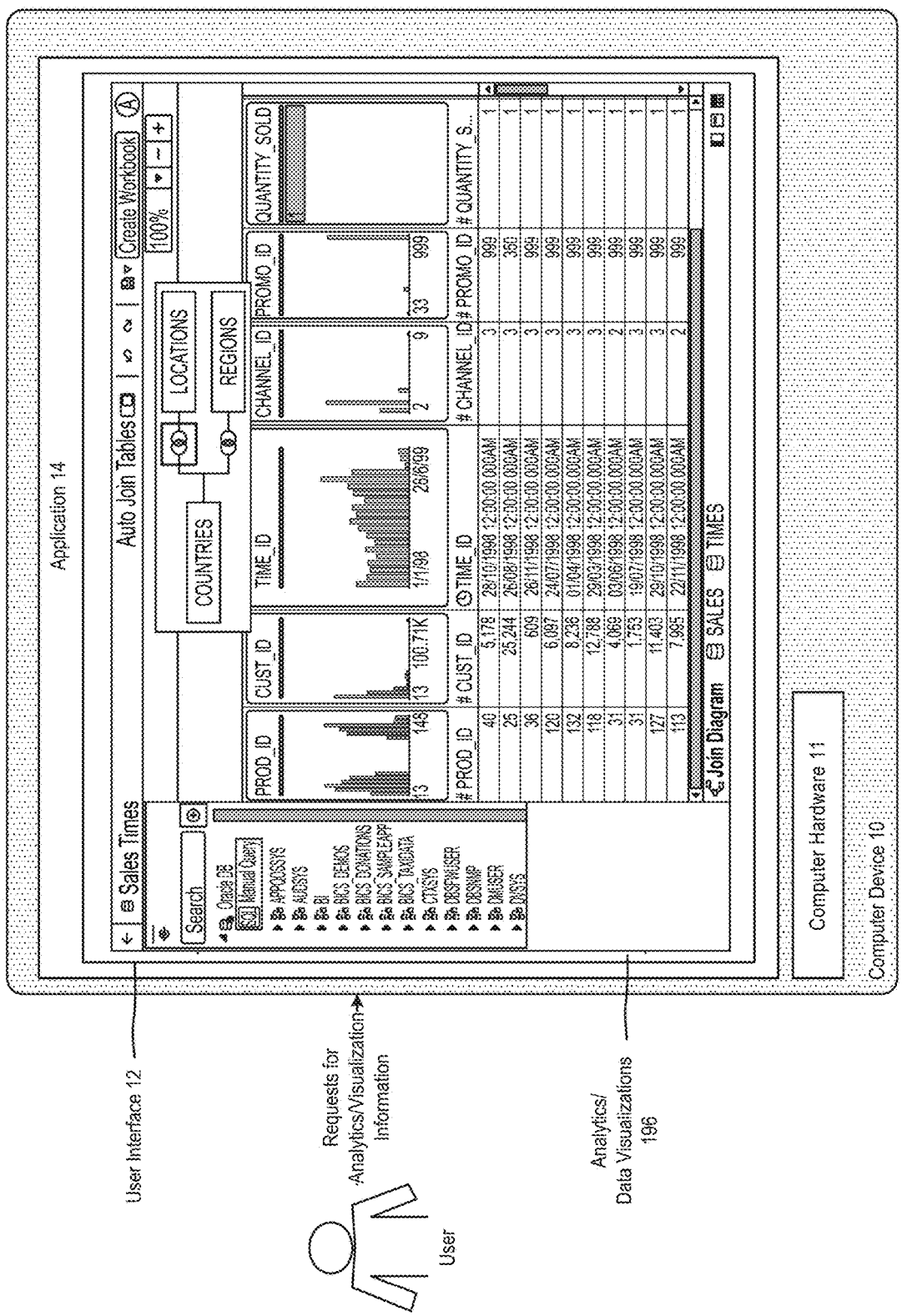
FIG. 11 illustrates various examples of user interfaces for use with a data analytics environment, in accordance with an embodiment.
Figure 12:
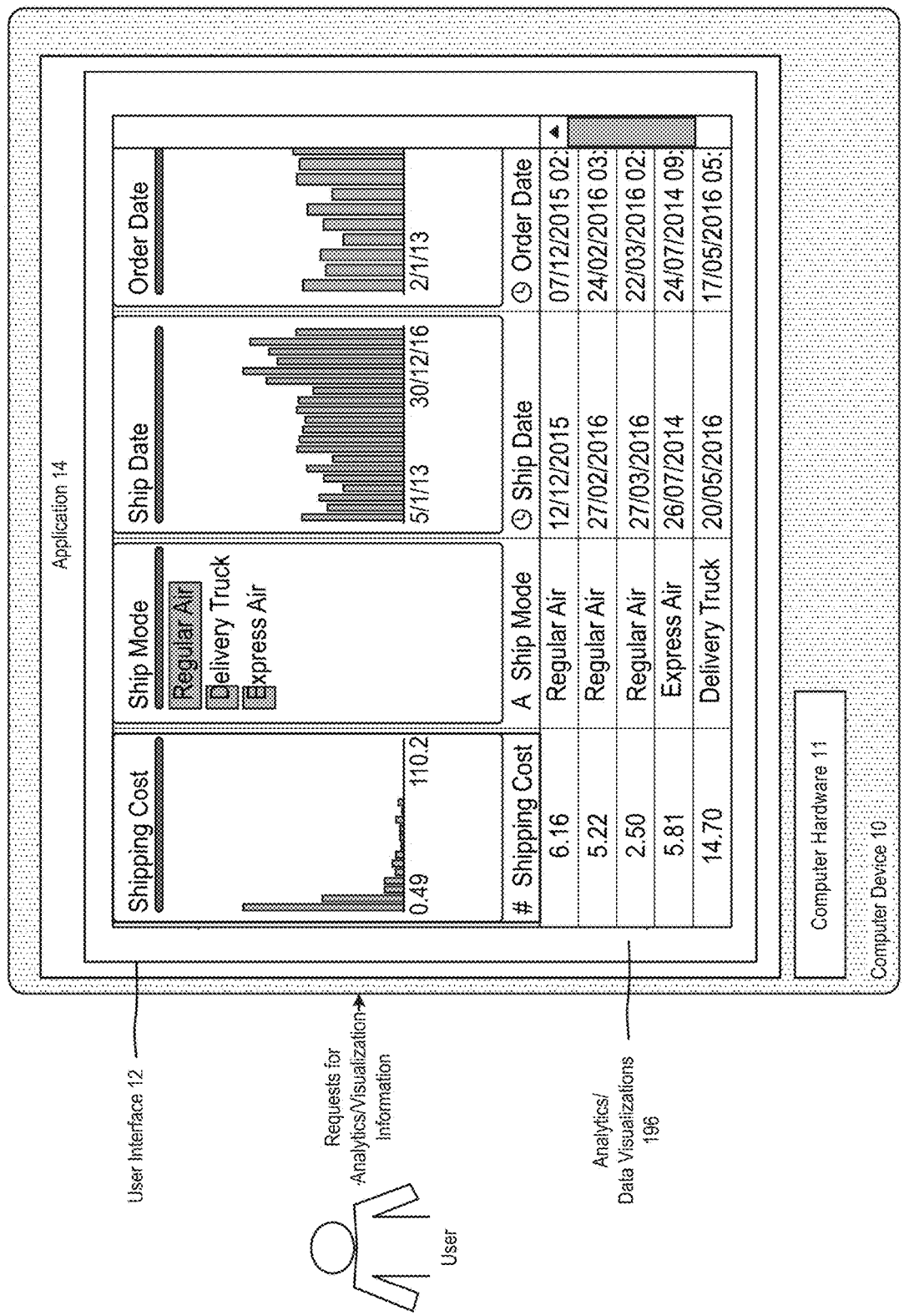
FIG. 12 illustrates various examples of user interfaces for use with a data analytics environment, in accordance with an embodiment.
Figure 13:
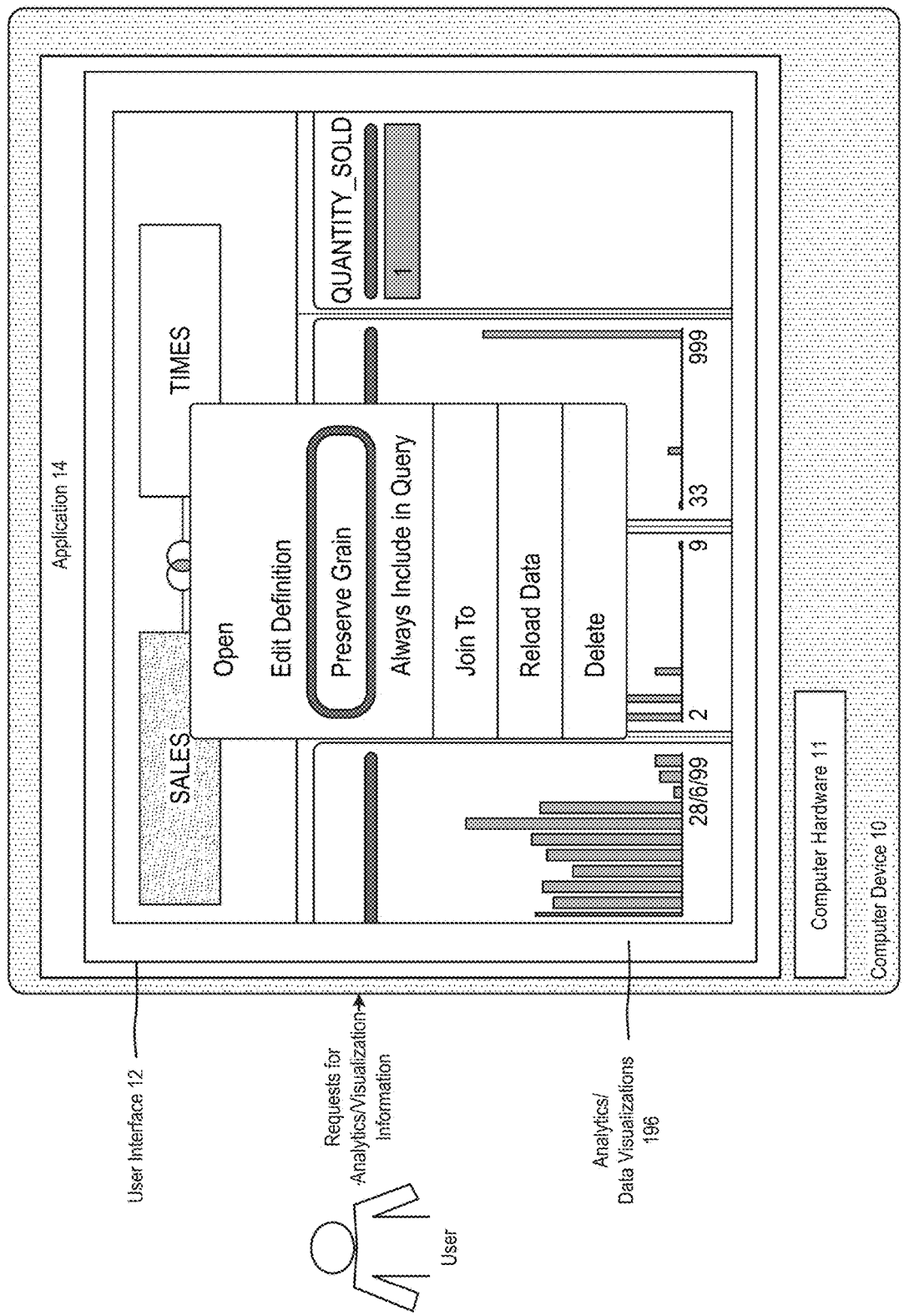
FIG. 13 illustrates various examples of user interfaces for use with a data analytics environment, in accordance with an embodiment.

As illustrated in FIGS. 11-12, in accordance with an embodiment, within the dataset editor a join diagram displays the tables and joins in a dataset. Joins that are defined in the data source can be automatically created between tables in the dataset, for example, by creating joins based on column name matches found between the tables.

In accordance with an embodiment, when the user selects a table, a preview data area displays a sample of the table's data. Displayed join links and icons indicate which tables are joined and the type of join used. The user can create a join by dragging and dropping one table onto another; click on a join to view or update its configuration; or click a column's type attribute to change its type, for example from a measure to an attribute.

In accordance with an embodiment, the system can generate source-specific optimized queries for a visualization, wherein a dataset is treated as a data model and only those tables needed to satisfy a visualization are used in the query.

By default a dataset's grain is determined by the table with the lowest grain. The user can create a measure in any table in a dataset; however, this can cause the measure on one side of a one-to-many or many-to-many relationship to be duplicated. In accordance with an embodiment illustrated in FIG. 13, to address this, the user can set the table on one side of a cardinality to preserve grain, to keep its level of detail.

Figure 14:
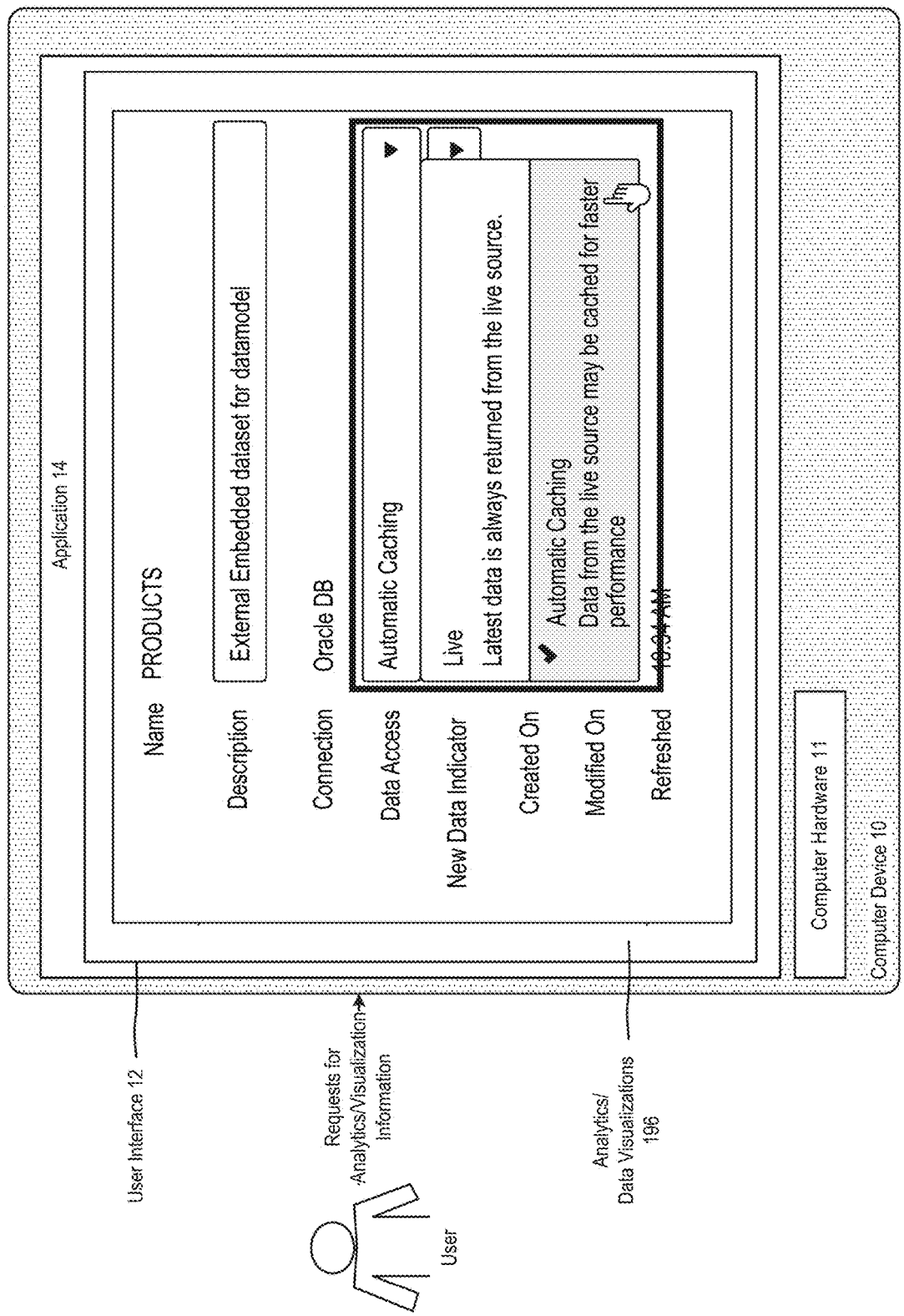
FIG. 14 illustrates various examples of user interfaces for use with a data analytics environment, in accordance with an embodiment.

As illustrated in FIG. 14, in accordance with an embodiment, dataset tables can be associated with a data access setting that determines if the system will load the table into cache, or alternatively if the table will receive its data directly from the data source.

In accordance with an embodiment, when automatic caching mode is selected for a table, the system loads or reloads the table data into cache, which provides faster performance when the table's data is refreshed, e.g., from a workbook, and causes the reload menu option to display at the table and dataset level.

In accordance with an embodiment, when live mode is selected for a table, the system retrieves the table data directly from the data source; and the source system manages the table's data source queries. This option is useful when the data is stored in a high-performance data warehouse such as, for example, Oracle ADW; and also ensures that the most-current data is used.

In accordance with an embodiment, when a dataset uses multiple tables, some tables can use automatic caching, while others can include live data. During reload of multiple tables using the same connection, if the reloading of data on one table fails, then any tables presently set to use automatic caching are switched to using live mode to retrieve their data.

In accordance with an embodiment, the system allows a user to enrich and transform their data before it is made available for analysis. When a workbook is created and a dataset added to it, the system performs column level profiling on a representative sample of the data. After profiling the data, the user can implement transformation and enrichment recommendations provided for recognizable columns in the dataset; such as, for example, GPS enrichments such as latitude and longitude for cities or zip codes.

In accordance with an embodiment, the data transformation and enrichment changes applied to a dataset affect the workbooks and dataflows that use the dataset. For example, when the user opens a workbook that shares the dataset, they receive a message indicating that the workbook uses updated or refreshed data.

In accordance with an embodiment, dataflows provide a means of organizing and integrating data to produce curated datasets that your users can visualize. For example, the user might use a dataflow to create a dataset, combine data from different sources, aggregate data, or train machine learning models or apply a predictive machine learning model to their data.

Figure 15:
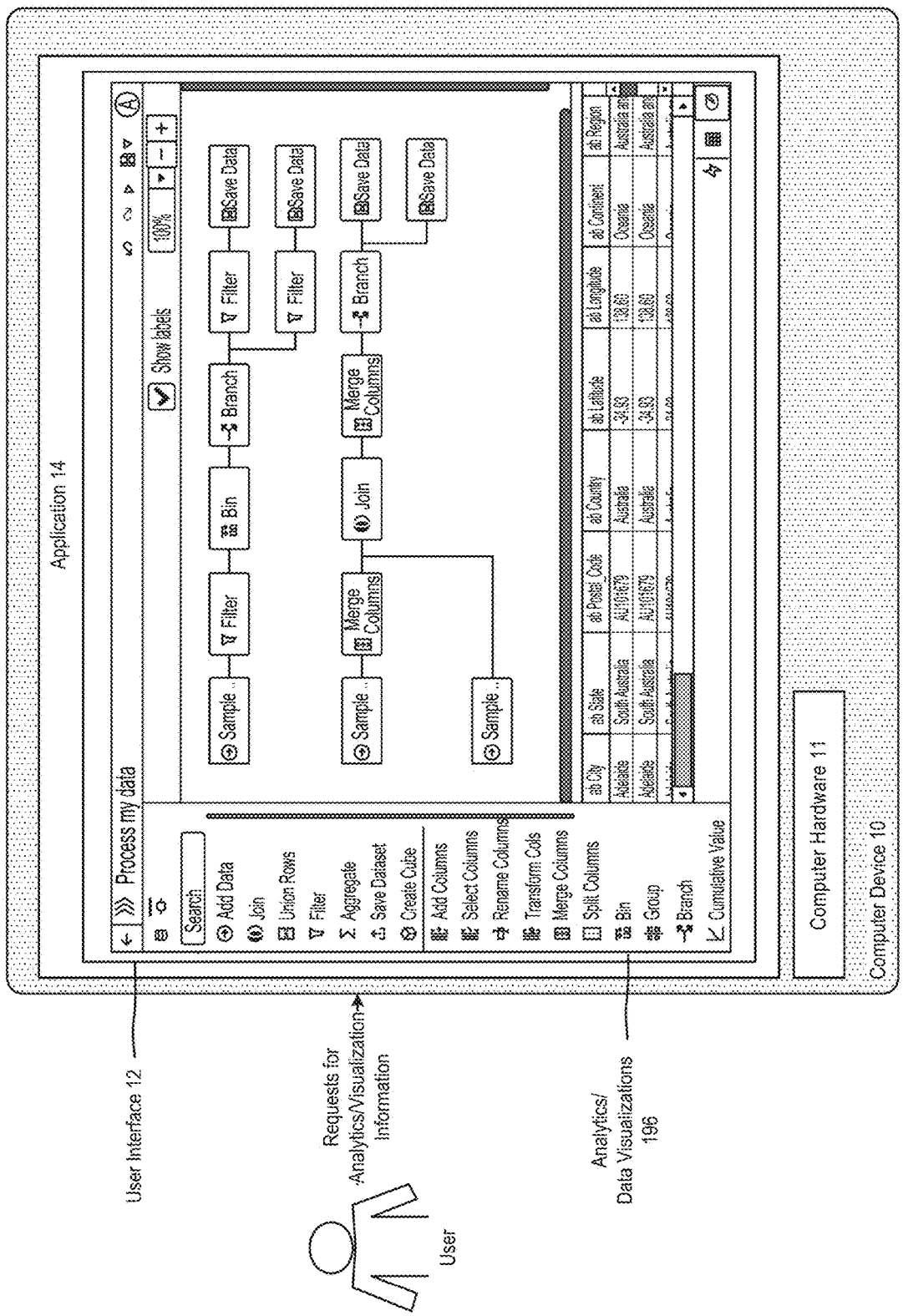
FIG. 15 illustrates various examples of user interfaces for use with a data analytics environment, in accordance with an embodiment.

As illustrated in FIG. 15, in accordance with an embodiment, within a dataflow each step performs a specific function, for example to add data, join tables, merge columns, transform data, or save data. Once configured, the dataflow can be executed to perform operations to produce or update a dataset, including for example the use of SQL operators, such as BETWEEN, LIKE, IN), conditional expressions, or functions.

In accordance with an embodiment, dataflows can be use merge datasets, cleanse data, and output the results to a new dataset. Dataflows can be executed individually or in a sequence. If any dataflow within a sequence fails, then all the changes made in the sequence are rolled back.

Figure 16:
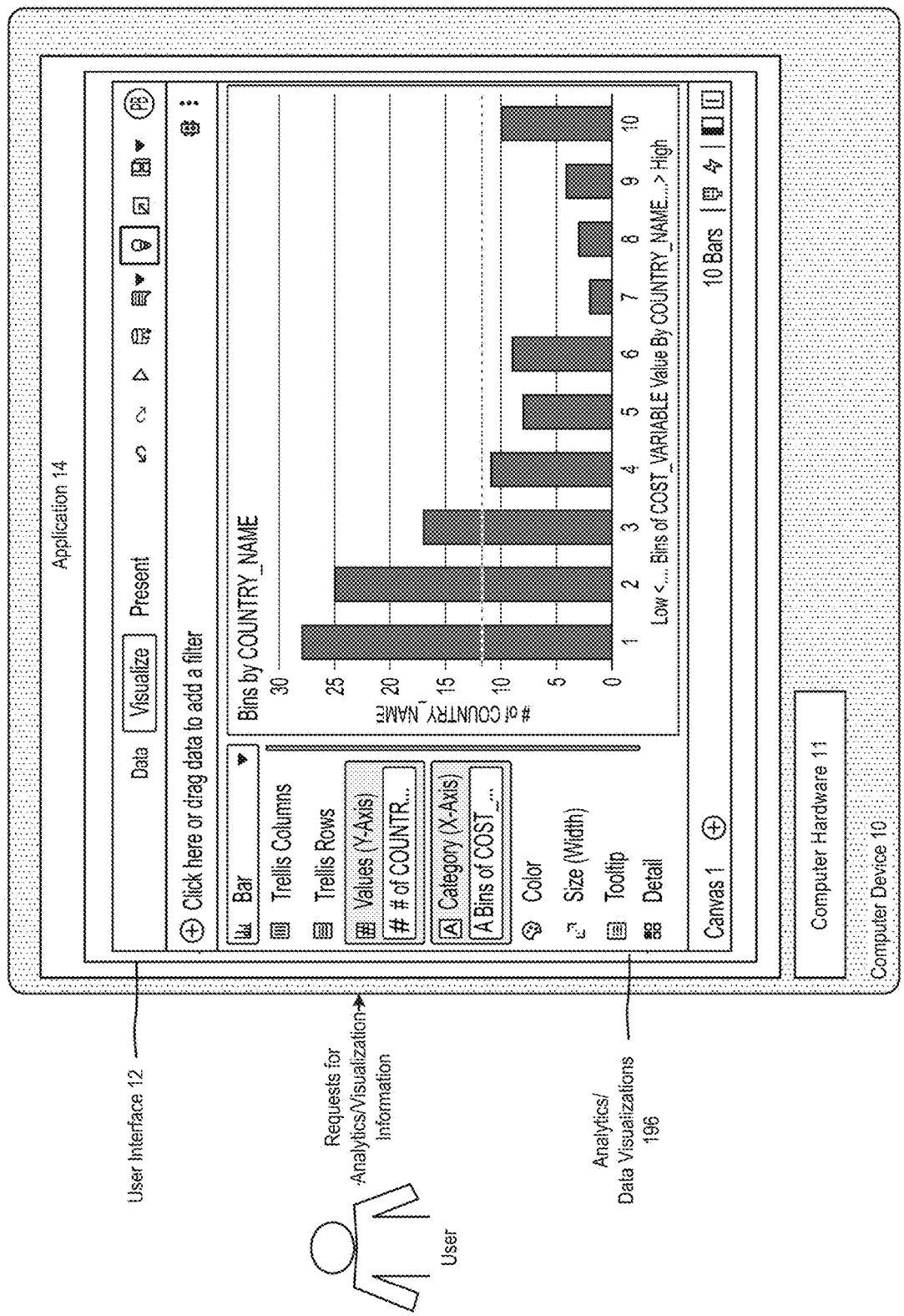
FIG. 16 illustrates various examples of user interfaces for use with a data analytics environment, in accordance with an embodiment.
Figure 17:
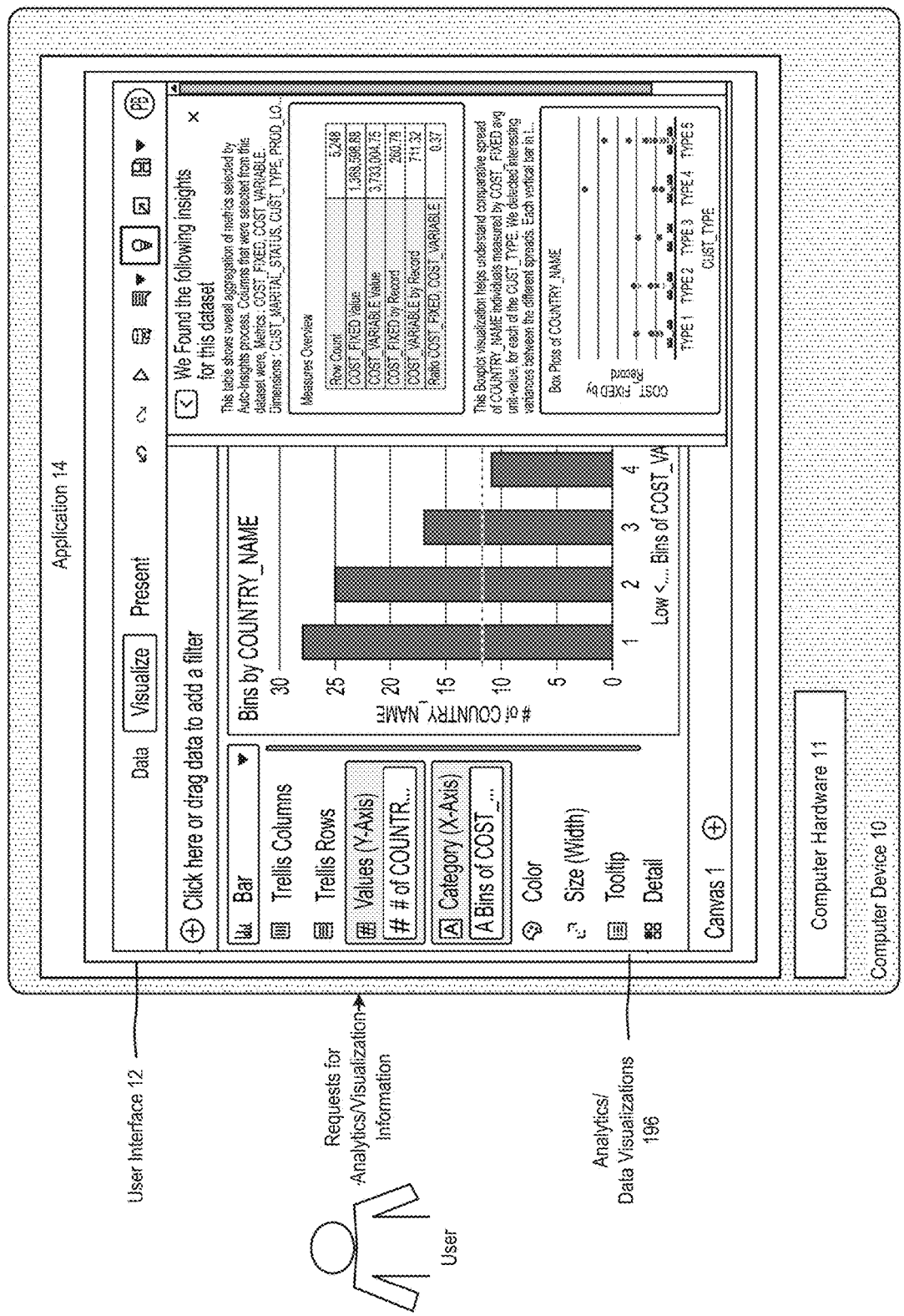
FIG. 17 illustrates various examples of user interfaces for use with a data analytics environment, in accordance with an embodiment.
Figure 18:
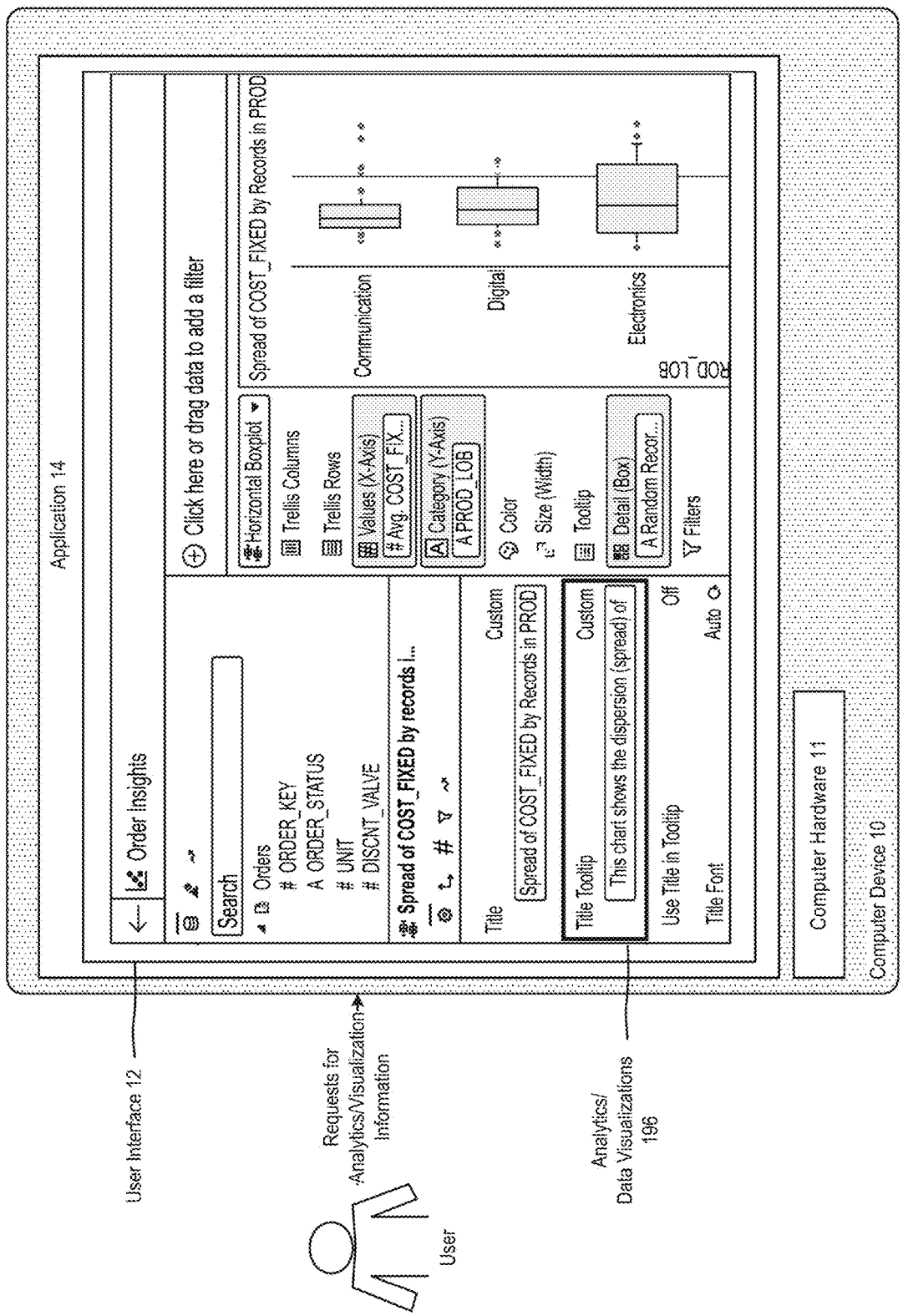
FIG. 18 illustrates various examples of user interfaces for use with a data analytics environment, in accordance with an embodiment.

As illustrated in FIGS. 16-18, in accordance with an embodiment, visualizations can be displayed within a user interface, for example to explore datasets or data sourced from multiple data sources, and to add insights.

For example, in accordance with an embodiment, the user can create a workbook, add a dataset, and then drag and drop its columns onto a canvas to create visualizations. The system can automatically generate a visualization based on the contents of the canvas, with one or more visualization types automatically selected for selection by the user. For example, if the user adds a revenue measure to the canvas, the data element may be placed in a values area of a grammar panel, and a Tile visualization type selected. The user can continue adding data elements directly to the canvas to build the visualization.

In accordance with an embodiment, the system can provide automatically generated data visualizations (automatically-generated insights, auto-insights), by suggesting visualizations which are expected to provide the best insights for a particular dataset. The user can review an insight's automatically generated summary, for example by hovering over the associated visualization in the workbook canvas.

Integrated Function Editor

In accordance with an embodiment, described herein is a system and method for providing an integrated function editor, for use with a data analytics environment.

In accordance with an embodiment, an analytics environment (e.g., an Oracle OAC environment) can be integrated with a cloud infrastructure or cloud environment (e.g., an Oracle OCI environment) using a function suite, such as, for example Oracle Functions. Such environments provide a fully managed, multi-tenant, highly scalable, on-demand, Functions-as-a-Service (FaaS) platform. They are built on enterprise-grade infrastructures, such as Oracle Cloud Infrastructure (OCI). Clients and users can use Functions (a platform that allows developers to create, run, and scale applications without managing infrastructure) when they want to focus on writing code to meet business needs.

In accordance with an embodiment, a serverless and elastic architecture (e.g., Oracle Functions) means there's no infrastructure administration or software administration for clients to hassle with. Such an architecture can allow clients to write code in a number of different languages, such as Java, Python, Node, Go, Ruby, and C #(and for advanced use cases, bring your own Dockerfile, and Graal VM). Clients can then deploy their code, call it directly or trigger it in response to events, and get billed only for the resources consumed during the execution.

In accordance with an embodiment, Oracle Functions is based on Fn Project. Fn Project is an open source, container native, serverless platform that can be run anywhere—any cloud or on-premises. Clients can access Oracle Functions using the Console, a CLI, and a REST API. Clients can invoke the functions you deploy to Oracle Functions using the CLI or by making signed HTTP requests. Oracle Functions is integrated with Oracle Cloud Infrastructure (OCI) Identity and Access Management (IAM), which provides easy authentication with native Oracle Cloud Infrastructure identity functionality.

For a user of an analytics environment (e.g., Oracle Analytics Cloud—OAC), the process of registering an OCI function requires access to both platforms and to undertake a number of steps in an orderly manner. For example, when creating a function, a user must first prepare the code for the function and then include function's metadata snippet. If these steps are followed without encountering any errors, only then the user can proceed to registering the function in OAC environment, which requires additional steps. This is a tedious process of switching between the two environments and its success being co-dependent creates a difficult user experience with unnecessary obstacles.

The steps needed to register an OCI Function in OAC require access to both platforms and a series of complex steps that have to be followed in a particular order.

First, a user needs to create a function in Oracle Cloud Infrastructure. This involves steps comprising: preparing the code for the function; including function metadata snippet; deploying function to OCI; and tagging the function with oac-compatible=TRUE After the function has been created, the user needs to register the function in OAC. This involves steps comprising: selecting a connection (e.g., OCI connection), selecting an application; and registering a previously deployed function.

In accordance with an embodiment, the present disclosure presents a solution. The solution can comprise integrating a function editor within an analytics framework (e.g., OAC) which can offer a simple way to create and update cloud infrastructure functions, e.g., OCI functions, from an analytics environment, e.g., OAC environment. The solution can comprise creating and registering cloud infrastructure functions, e.g., OCI functions, from an analytics environment, e.g., OAC. Parameters, such as, name, description, output columns, and options can be created from OAC UI. The new function will be deployed in OCI, so someone else could edit the code later from either OCI or OAC. While the function is not implemented, it will appear as disabled in OAC. Once the function developer completes and updates the code in OCI, the function will appear available in OAC.

In accordance with an embodiment, examples of functions in OCI that could be used could be to analyze text, or to convert text from one language to another. The system can be used generically with any functions as a service environment, including any functions in OCI, to integrate those functions into an analytics environment, such as OAC.

In accordance with an embodiment, various examples shown herein allow the user interface in an analytics environment, e.g., OAC to be used to register the function in OCI. Alternatively, the system can access an existing function in OCI from within OAC. The system can push the function as defined from OAC to OCI, where the function is stored. From the analytics perspective, the use of a data analytics environment, e.g., OAC, can see the functions from an analytics perspective without regard to how it is implemented in OCI.

Figure 19:
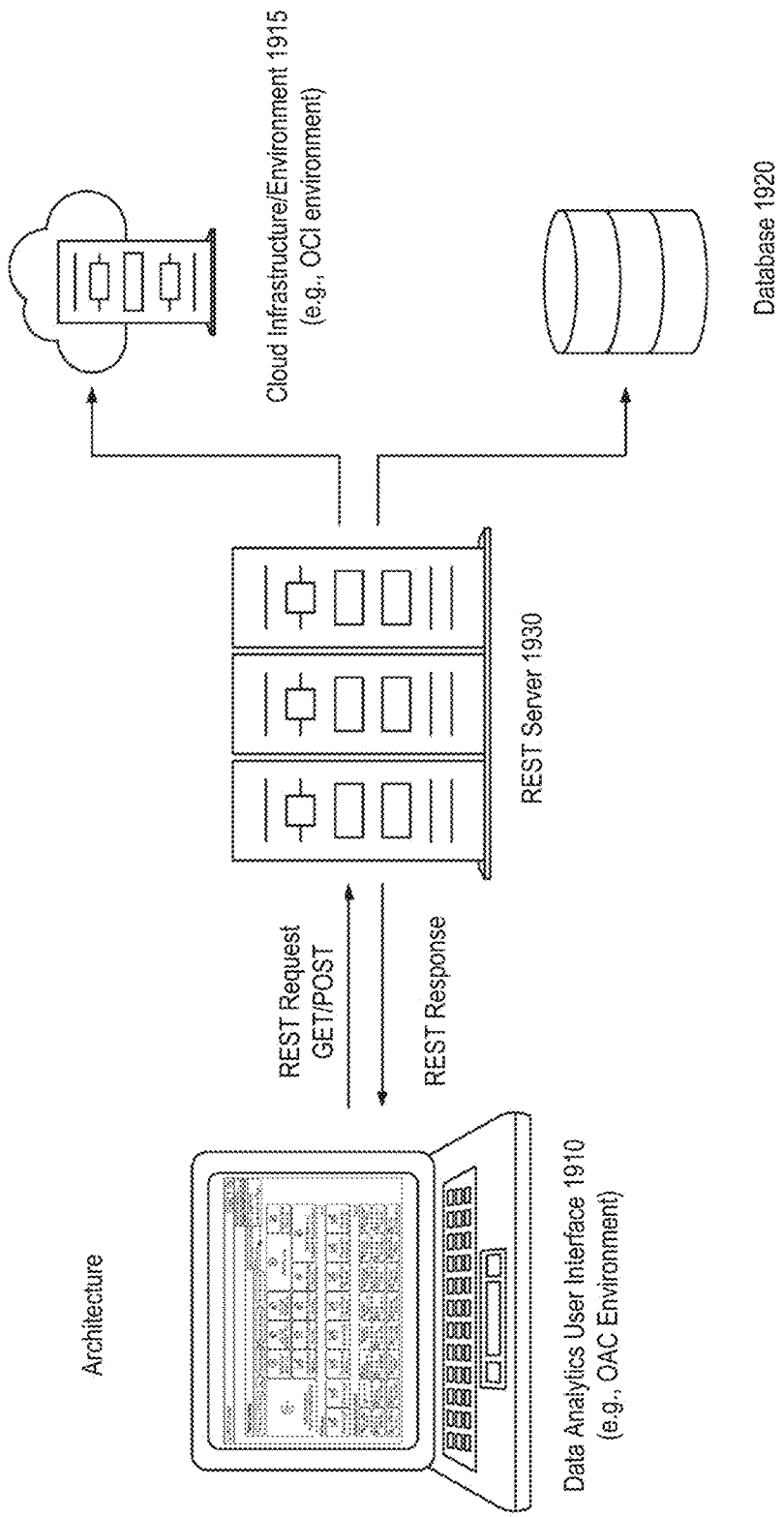
FIG. 19 illustrates the use of an integrated function editor with a data analytics environment, in accordance with an embodiment.

FIG. 19 illustrates the use of an integrated function editor with a data analytics environment, in accordance with an embodiment.

As illustrated in FIG. 19, in accordance with an embodiment, at the front end there can be a client (e.g., OAC/OCI) user interface 1910 that allows a user to interact with an analytics environment (e.g., an Oracle OAC environment) and/or cloud infrastructure or cloud environment (e.g., an Oracle OCI environment). A database 1920 stores information related to the datasets, connections, functions, scripts, dataflows etc., that allows information to be retrieved from a cloud infrastructure or cloud environment (e.g., an Oracle OCI environment) 1915 and used in an analytics environment (e.g., an Oracle OAC environment). The client can communicate with the OCI environment and database via, for example, a REST-based server 1930.

FIG. 20 further illustrates the use of an integrated function editor, in accordance with an embodiment.

As illustrated in FIG. 20, in accordance with an embodiment, the metadata (shown here on the left) can be used within an OAC dataflow. The function description metadata (funcDescription) includes parameters than allow the function to be registered in an analytics environment (e.g., OAC) and in a cloud infrastructure or cloud environment (e.g., OCI), and forms a contract between both sides.

FIG. 21 further illustrates the use of an integrated function editor, in accordance with an embodiment.

As illustrated in FIG. 21, in accordance with an embodiment the functions defined by the functional description metadata are then exposed for use in the (e.g., OAC) user interface as compatible functions.

FIG. 22 further illustrates the use of an integrated function editor, in accordance with an embodiment.

As illustrated in FIG. 23, in accordance with an embodiment, after creating the contract as described above, the system can illustrate to the user the function parameters that they can review and use as desired.

FIG. 23 further illustrates the use of an integrated function editor, in accordance with an embodiment.

As illustrated in FIG. 23, in accordance with an embodiment, once the function is created and registered, a user can view a list of cloud infrastructure functions, e.g., OCI functions, and incorporate the function into code as desired.

Figure 24:
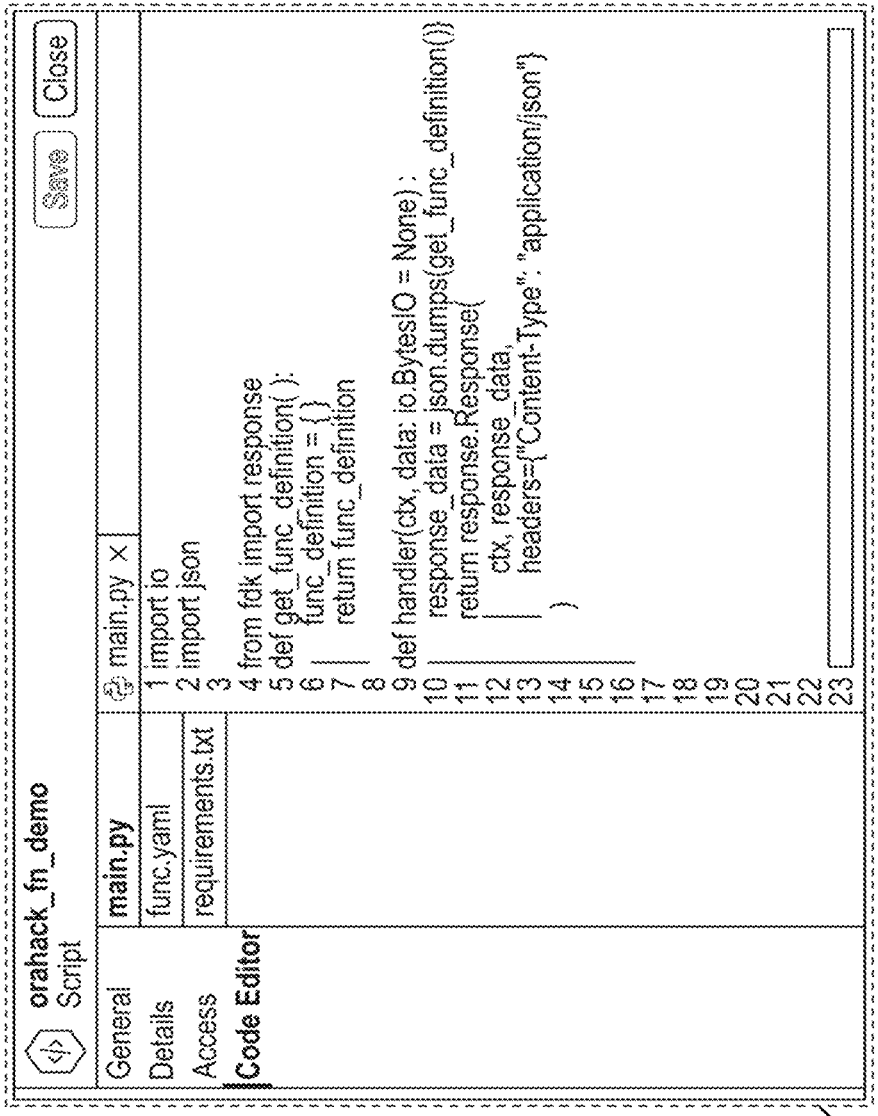
FIG. 24 further illustrates the use of an integrated function editor, in accordance with an embodiment.

FIG. 24 further illustrates the use of an integrated function editor, in accordance with an embodiment.

As illustrated in FIG. 24, in accordance with an embodiment, a user can update a file content associated with a function.

FIG. 25 further illustrates the use of an integrated function editor, in accordance with an embodiment.

As illustrated in FIG. 25, in accordance with an embodiment, a user can redeploy a function.

Figure 26:
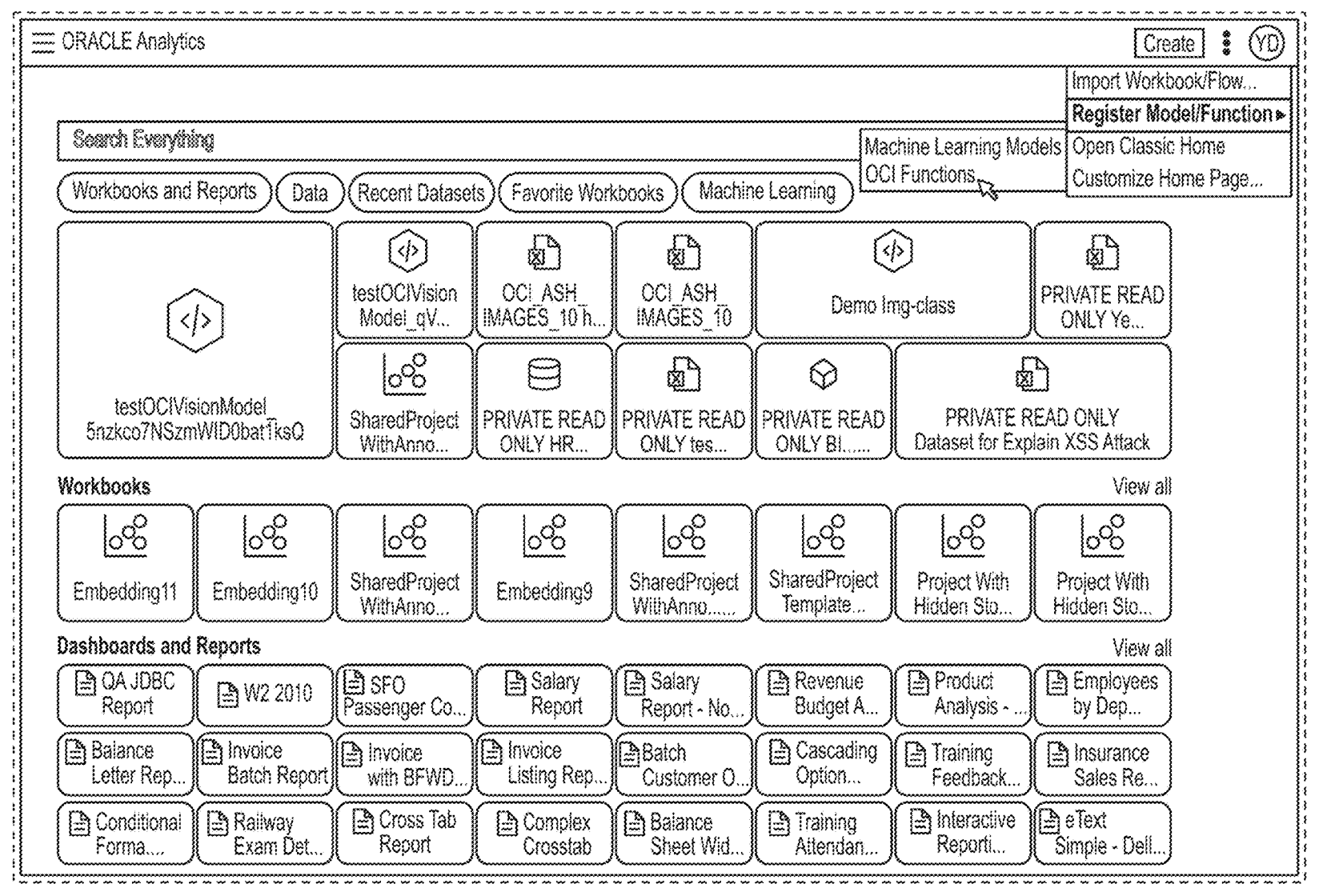

FIG. 26 further illustrates the use of an integrated function editor, in accordance with an embodiment.

As illustrated in FIG. 26, in accordance with an embodiment the functions can be displayed for the user and used in workbooks as desired within OAC.

In accordance with an embodiment, the function description (e.g., as shown in FIG. 20 and described above) can be used, for example, in an analytics environment (e.g., an Oracle OAC environment) to create an API that allows connection of the OAC environment to a cloud infrastructure or cloud environment (e.g., OCI) database. Once the function is created it can be used to generate an image which can be pushed to an OCI environment for execution thereon. For example, the processes described at the outset to create the function in OCI can be used to push the function to OCI.

Figure 27:
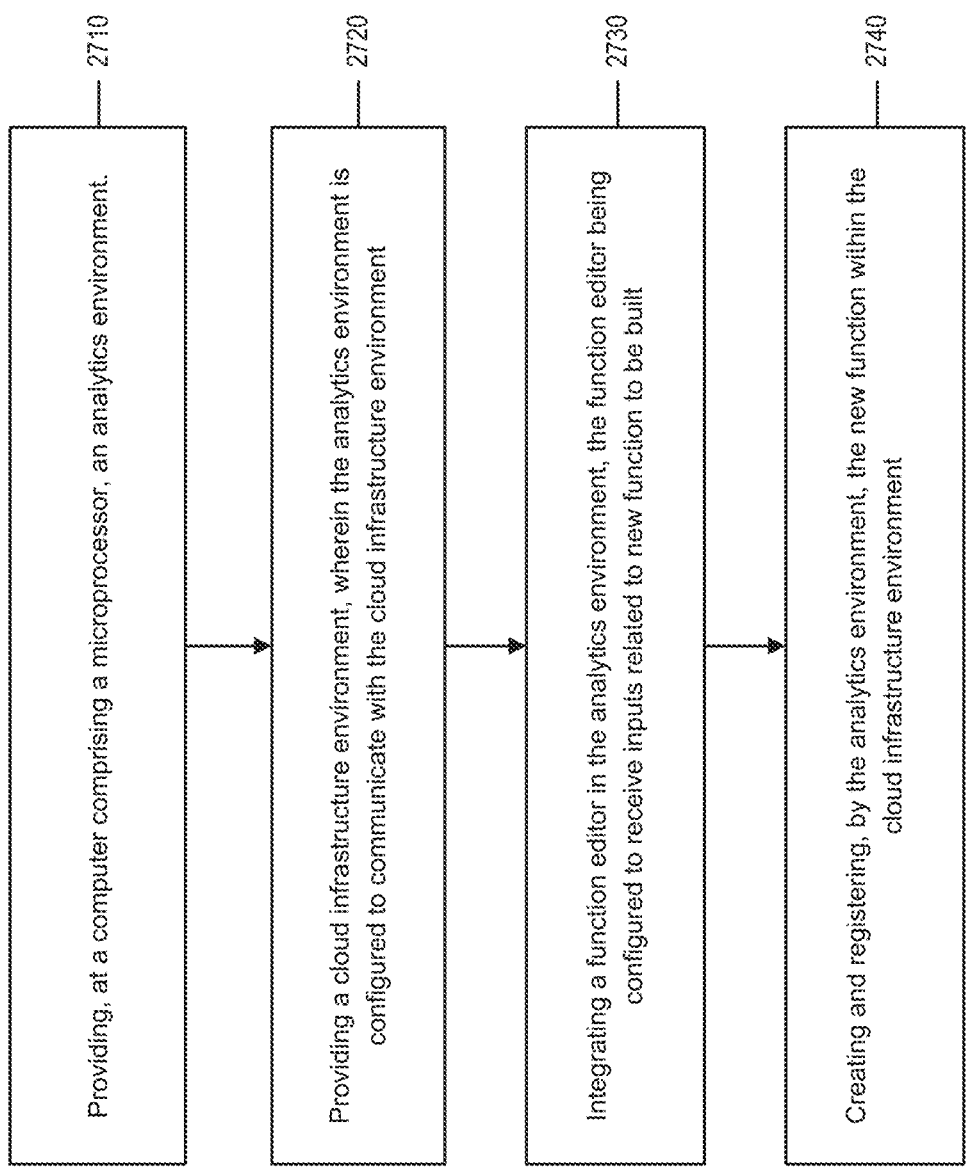
FIG. 27 illustrates a method of providing an integrated function editor, in accordance with an embodiment.

FIG. 27 illustrates a method of providing an integrated function editor, in accordance with an embodiment.

As illustrated in FIG. 27, in accordance with an embodiment, at step 2710, the method can provide, at a computer comprising a microprocessor, an analytics environment.

In accordance with an embodiment, at step 2720, the method can provide a cloud infrastructure environment, wherein the analytics environment is configured to communicate with the cloud infrastructure environment.

In accordance with an embodiment, at step 2730, the method can integrate a function editor in the analytics environment, the function editor being configured to receive inputs related to new function to be built.

In accordance with an embodiment, at step 2740, the method can create and register, by the analytics environment, the new function within the cloud infrastructure environment.

In accordance with an embodiments, advantages of the described system include, for example, to integrates analytics environment (e.g., OAC) customers with cloud infrastructure or cloud environment (e.g., OCI) capabilities, so they can integrate more complex analysis to their data using the power and services from OCI without leaving their OAC interface. The advantage is that they only need to be familiar with OAC interface to also use OCI services and the execution of their FaaS functions will be on the OCI side that will accelerate the processes and give faster results.

Additional advantages include, for example, the ability to create a contract as described above from within the user interface; an improved user interface process wherein the functions can be created as part of the dataflow process—for example when we add a step to a dataflow we can insert a function there, to take advantage of the dataset being accessed, and its columns and dataset type being compatible with the function; ability to edit functions within the dataflow development, to provide a more iterative development process.

In accordance with various embodiments, the teachings herein can be implemented using one or more computer, computing device, machine, or microprocessor, including one or more processors, memory and/or computer readable storage media programmed according to the teachings herein. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Further modifications and variations will be apparent to the practitioner skilled in the art.

The embodiments were chosen and described in order to best explain the principles of the teachings herein and their practical application, thereby enabling others skilled in the art to understand the various embodiments and with various modifications that are suited to the particular use contemplated. It is intended that the scope be defined by the following claims and their equivalents.

What is claimed is:

1. A system for providing an integrated function editor, for use with a data analytics environment, comprising:
a computer comprising a microprocessor, at which a cloud analytics environment is provided;
a cloud infrastructure environment, wherein the cloud analytics environment is configured to communicate with the cloud infrastructure environment;
wherein a function editor is provided, the function editor being integrated in the cloud analytics environment, the function editor being configured to receive inputs from a user via the cloud analytics environment related to a new function;
wherein the received inputs related to the new function indicate the new function to create an interface that provides for a connection between the cloud analytics environment and a database of the cloud infrastructure environment;
wherein the cloud analytics environment creates and registers, via the function editor integrated therein, the new function within the cloud infrastructure environment;
wherein upon the new function being created and registered within the cloud infrastructure environment, the new function is deployed within the cloud infrastructure environment, wherein the deployed new function is accessible for editing from both the cloud analytics environment and the cloud infrastructure environment; and
wherein the new function comprises one or more parameters which allow the new function to be registered at both the cloud analytics environment and the cloud infrastructure environment.

2. The system of claim 1, wherein the new function comprising the one or more parameters and is deployed at the cloud infrastructure environment.

3. The system of claim 2, wherein the one or more parameters comprise at least one of name, description, output columns, and options.

4. The system of claim 3, wherein the one or more parameters are created at the cloud infrastructure environment.

5. The system of claim 1, wherein the cloud infrastructure environment has deployed thereon at least one old function.

6. The system of claim 5, wherein the function editor requests access to the at least one old function at the cloud infrastructure environment.

7. The system of claim 6,
wherein the function editor displays for editing at least a portion of the at least one old function;
wherein upon receiving inputs related to edits to the at least one old function, the function editor edits the at least one old function and registers the edits within the cloud infrastructure environment.

8. A method for providing an integrated function editor, for use with a data analytics environment, comprising:
providing, at a computer comprising a microprocessor, an analytics environment;
providing a cloud infrastructure environment, wherein the analytics environment is configured to communicate with the cloud infrastructure environment;
providing and integrating a function editor in the analytics environment, the function editor being configured to receive inputs from a user via the cloud analytics environment related to a new function, wherein the received inputs related to the new function indicate the new function to create an interface that provides for a connection between the cloud analytics environment and a database of the cloud infrastructure environment;
creating and registering, by the cloud analytics environment, via the function editor integrated therein, the new function within the cloud infrastructure environment;
upon the new function being created and registered within the cloud infrastructure environment, deploying the new function within the cloud infrastructure environment, wherein the deployed new function is accessible for editing from both the cloud analytics environment and the cloud infrastructure environment; and
wherein the new function comprises one or more parameters which allow the new function to be registered at both the cloud analytics environment and the cloud infrastructure environment.

9. The method of claim 8, wherein the new function comprising the one or more parameters and is deployed at the cloud infrastructure environment.

10. The method of claim 9, wherein the one or more parameters comprise at least one of name, description, output columns, and options.

11. The method of claim 10, wherein the one or more parameters are created at the cloud infrastructure environment.

12. The method of claim 8, wherein the cloud infrastructure environment has deployed thereon at least one old function.

13. The method of claim 12, wherein the function editor requests access to the at least one old function at the cloud infrastructure environment.

14. The method of claim 13,
wherein the function editor displays for editing at least a portion of the at least one old function;
wherein upon receiving inputs related to edits to the at least one old function, the function editor edits the at least one old function and registers the edits within the cloud infrastructure environment.

15. A non-transitory computer readable storage medium, including instructions stored thereon which when read and executed by one or more computers cause the one or more computers to perform a method comprising:
providing, at a computer comprising a microprocessor, an analytics environment;
providing a cloud infrastructure environment, wherein the analytics environment is configured to communicate with the cloud infrastructure environment;
providing and integrating a function editor in the analytics environment, the function editor being configured to receive inputs from a user via the cloud analytics environment related to a new function, wherein the received inputs related to the new function indicate the new function to create an interface that provides for a connection between the cloud analytics environment and a database of the cloud infrastructure environment;

creating and registering, by the cloud analytics environment, via the function editor integrated therein, the new function within the cloud infrastructure environment;

upon the new function being created and registered within the cloud infrastructure environment, deploying the new function within the cloud infrastructure environment, wherein the deployed new function is accessible for editing from both the cloud analytics environment and the cloud infrastructure environment; and wherein the new function comprises one or more parameters which allow the new function to be registered at both the cloud analytics environment and the cloud infrastructure environment.

16. The non-transitory computer readable storage medium of claim 15, wherein the new function comprising the one or more parameters and is deployed at the cloud infrastructure environment.

17. The non-transitory computer readable storage medium of claim 16, wherein the one or more parameters comprise at least one of name, description, output columns, and options.

18. The non-transitory computer readable storage medium of claim 17, wherein the one or more parameters are crated at the cloud infrastructure environment.

19. The non-transitory computer readable storage medium of claim 15, wherein the cloud infrastructure environment has deployed thereon at least one old function.

20. The non-transitory computer readable storage medium of claim 19, wherein the function editor requests access to the at least one old function at the cloud infrastructure environment;

wherein the function editor displays for editing at least a portion of the at least one old function; and wherein upon receiving inputs related to edits to the at least one old function, the function editor edits the at least one old function and registers the edits within the cloud infrastructure environment.

* * * * *

UNITED STATES PATENT AND TRADEMARK OFFICE
CERTIFICATE OF CORRECTION

PATENT NO. : 12,271,349 B2
APPLICATION NO. : 18/116707
DATED : April 8, 2025
INVENTOR(S) : Ramirez et al.

It is certified that error appears in the above-identified patent and that said Letters Patent is hereby corrected as shown below:

In the Specification

In Column 3, Line 38, delete "organization," and insert -- organization. --, therefor.

In Column 18, Line 6, delete "C #(and" and insert -- C# (and --, therefor.

In Column 18, Line 41, delete "oac-compatible=TRUE" and insert -- oac-compatible=TRUE. --, therefor.

In the Claims

In Column 24, Line 2, in Claim 18, delete "crated" and insert -- created --, therefor.

Signed and Sealed this
First Day of July, 2025

Coke Morgan Stewart
*Acting Director of the United States Patent and Trademark Office*